United States Patent
Suzuki et al.

(12) 
(10) Patent No.: US 6,694,607 B2
(45) Date of Patent: Feb. 24, 2004

(54) METHOD OF AND APPARATUS FOR MANUFACTURING FILM CARTRIDGE

(75) Inventors: Chiaki Suzuki, Minamiashigara (JP); Susumu Sato, Minamiashigara (JP); Takayuki Kambara, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/285,498

(22) Filed: Nov. 1, 2002

(65) Prior Publication Data

US 2003/0051330 A1 Mar. 20, 2003

Related U.S. Application Data

(62) Division of application No. 09/612,248, filed on Jul. 7, 2000, now Pat. No. 6,519,839.

(30) Foreign Application Priority Data

Jul. 7, 1999 (JP) ............................................. 11-192914

(51) Int. Cl.⁷ ................................................. B23P 19/00
(52) U.S. Cl. ........................................... 29/806; 29/464
(58) Field of Search ........................ 29/806, 773, 710, 29/464; 53/430

(56) References Cited

U.S. PATENT DOCUMENTS

| | | | |
|---|---|---|---|
| 3,712,553 A | 1/1973 | Napor et al. | |
| 3,714,761 A | 2/1973 | Herford et al. | |
| 3,823,888 A | 7/1974 | Zangenfeind et al. | |
| 4,653,628 A | 3/1987 | Claypool et al. | |
| 4,924,419 A * | 5/1990 | McIntyre et al. | 702/82 |
| 4,965,931 A | 10/1990 | Suzuki et al. | |
| 4,974,316 A * | 12/1990 | Suzuki et al. | 29/806 |
| 5,044,144 A | 9/1991 | Foote, Jr. et al. | |
| 5,115,617 A | 5/1992 | Lewis et al. | |
| 5,119,549 A | 6/1992 | Foote, Jr. et al. | |
| 5,163,633 A | 11/1992 | Watkins | |
| 5,172,470 A | 12/1992 | Ichikawa et al. | |
| 5,669,205 A * | 9/1997 | Rice et al. | 53/430 |
| 5,919,028 A | 7/1999 | Edqvist | |
| 6,018,929 A * | 2/2000 | Suzuki et al. | 53/118 |
| 6,092,352 A | 7/2000 | Tanaka | |

FOREIGN PATENT DOCUMENTS

| | | |
|---|---|---|
| JP | 10-258806 | 9/1998 |
| JP | 10-066871 | 10/1998 |

* cited by examiner

*Primary Examiner*—Gregory Vidovich
*Assistant Examiner*—Stephen Kenny
(74) *Attorney, Agent, or Firm*—Sughrue Mion, PLLC

(57) ABSTRACT

A cartridge positioning and holding mechanism has a fixed guide for positioning a single-open-ended cartridge when the single-open-ended cartridge is inserted in an axial direction thereof with a cap positioned ahead, and a movable chuck openable and closable for forming and holding the single-open-ended cartridge after a film coil is inserted into the single-open-ended cartridge in an axial direction of the spool of the film coil. The film coil can be inserted into the single-open-ended cartridge highly accurately and efficiently with a simple and small arrangement.

7 Claims, 35 Drawing Sheets

FIG. 33
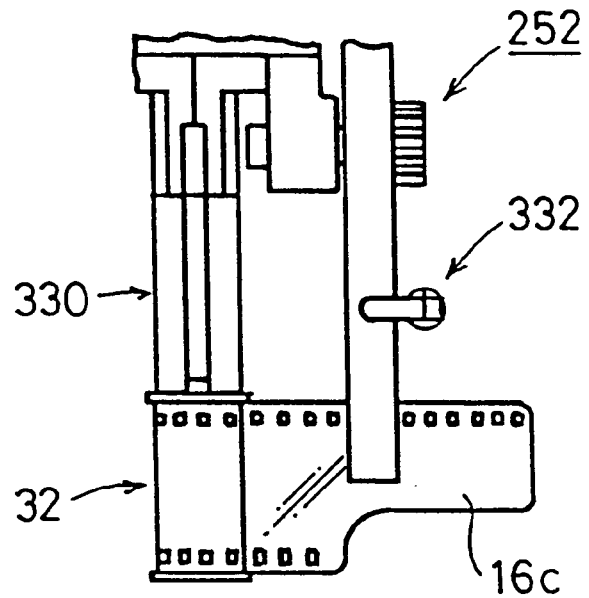
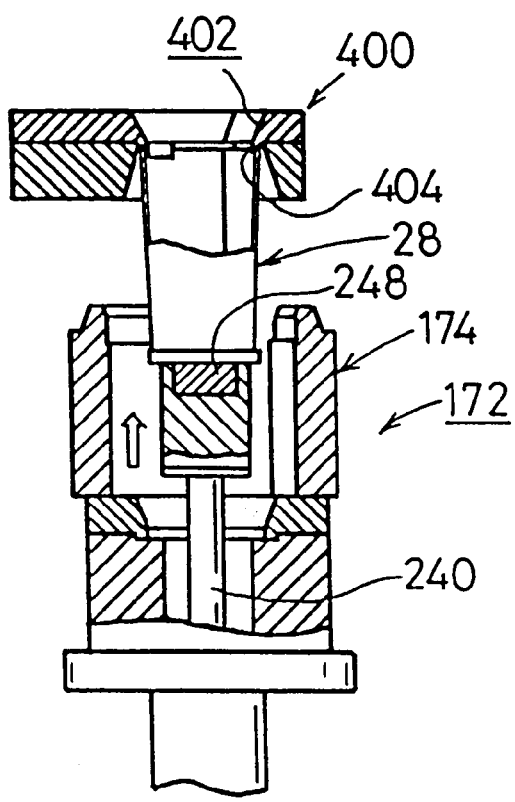

FIG. 35
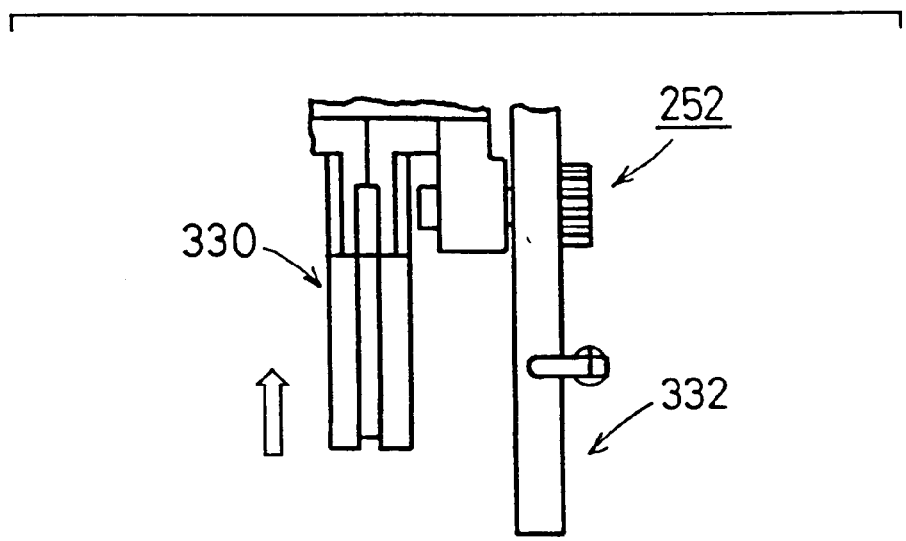
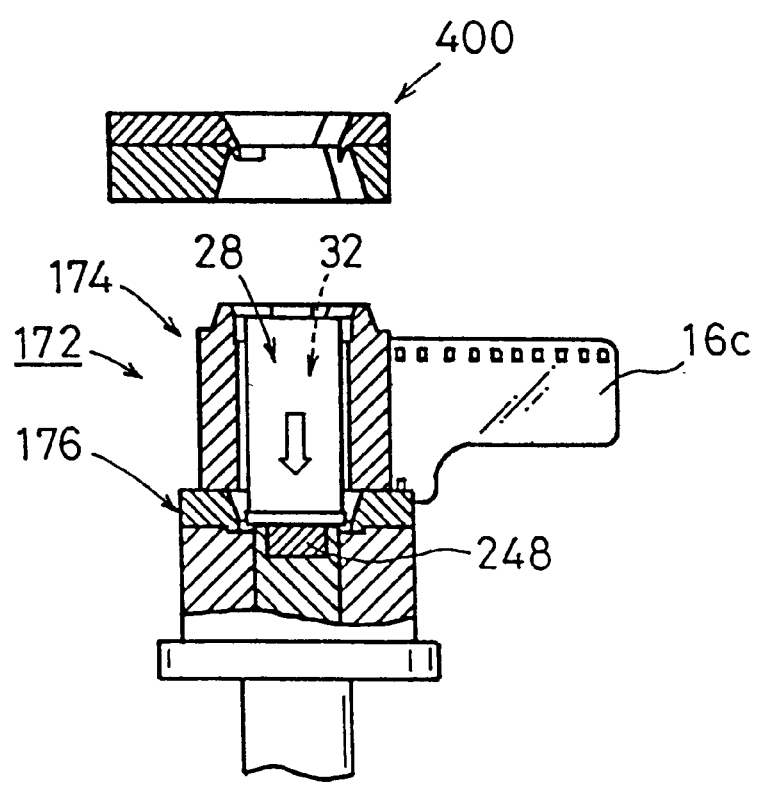

METHOD OF AND APPARATUS FOR MANUFACTURING FILM CARTRIDGE

This is a divisional of Application Ser. No. 09/612,248 filed Jul. 7, 2000, now issued U.S. Pat. No. 6,519,839 the disclosure of which is incorporated herein by reference.

BACKGROUND OF THE INVENTION

1. Field of the Invention

The present invention relates to a method of and an apparatus for manufacturing a film cartridge by inserting a rolled photographic film into a cartridge with one open end, which is held in position.

2. Description of the Related Art

Usually, a photographic film is produced and packaged by preparing a photographic film of given size, rolling the photographic film, placing the rolled photographic film into a cartridge, and inserting the film cartridge into a case (outer package). Various apparatus have heretofore been proposed to produce a film cartridge by inserting a film roll wound on a spool into a cartridge.

For example, as shown in FIG. 36 of the accompanying drawings, Japanese laid-open patent publication No. 10-258806 discloses an apparatus having a pair of openable and closable jaw members 1, 2 having a predetermined shape for closing a preformed shell 4 around a film roll 3. The jaw members 1, 2 are operatively coupled to an actuator 8 by a series of pivot shafts 5a through 5e and connecting rings 6, 7.

The jaw members 1, 2 can be opened and closed a plurality of times by the actuator 8. Therefore, the jaw members 1, 2 can chuck the preformed shell 4 as a cartridge barrel and insert the film roll 3 into the preformed shell 4 in an inserting station, and deliver a cartridge to a cartridge capping station. After the cartridge is capped, the jaw members 1, 2 can transfer the capped cartridge to a next process, after which the jaw members 1, 2 return to the inserting station where a preformed shell 4 is chucked and a film roll 3 is inserted into the preformed shell 4.

In the conventional apparatus shown in FIG. 36, the preformed shell 4 is of a widely open shape in order to allow the film roll 3 to be inserted horizontally into the preformed shell 4. The jaw members 1, 2 need to be opened and closed through a considerable large angle for gripping the preformed shell 4. The jaw members 1, 2 are opened and closed a plurality of times by the actuator 8, and are angularly moved for transferring the cartridge between the two stations. To permit the jaw members 1, 2 to make such actions, the jaw members 1, 2 have a number of pivot shafts 5a through 5e, and hence their overall structure is considerably complex and large.

SUMMARY OF THE INVENTION

It is a principal object of the present invention to provide a method of and an apparatus for manufacturing a film cartridge highly accurately and efficiently with an effectively reduced apparatus size and a simple arrangement.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 33 is a cross-sectional view showing the manner in which the cartridge with one open end is lifted;

FIG. 35 is a cross-sectional view showing the manner in which the cartridge with one open end is lowered.

DESCRIPTION OF THE PREFERRED EMBODIMENT

Figure 1:
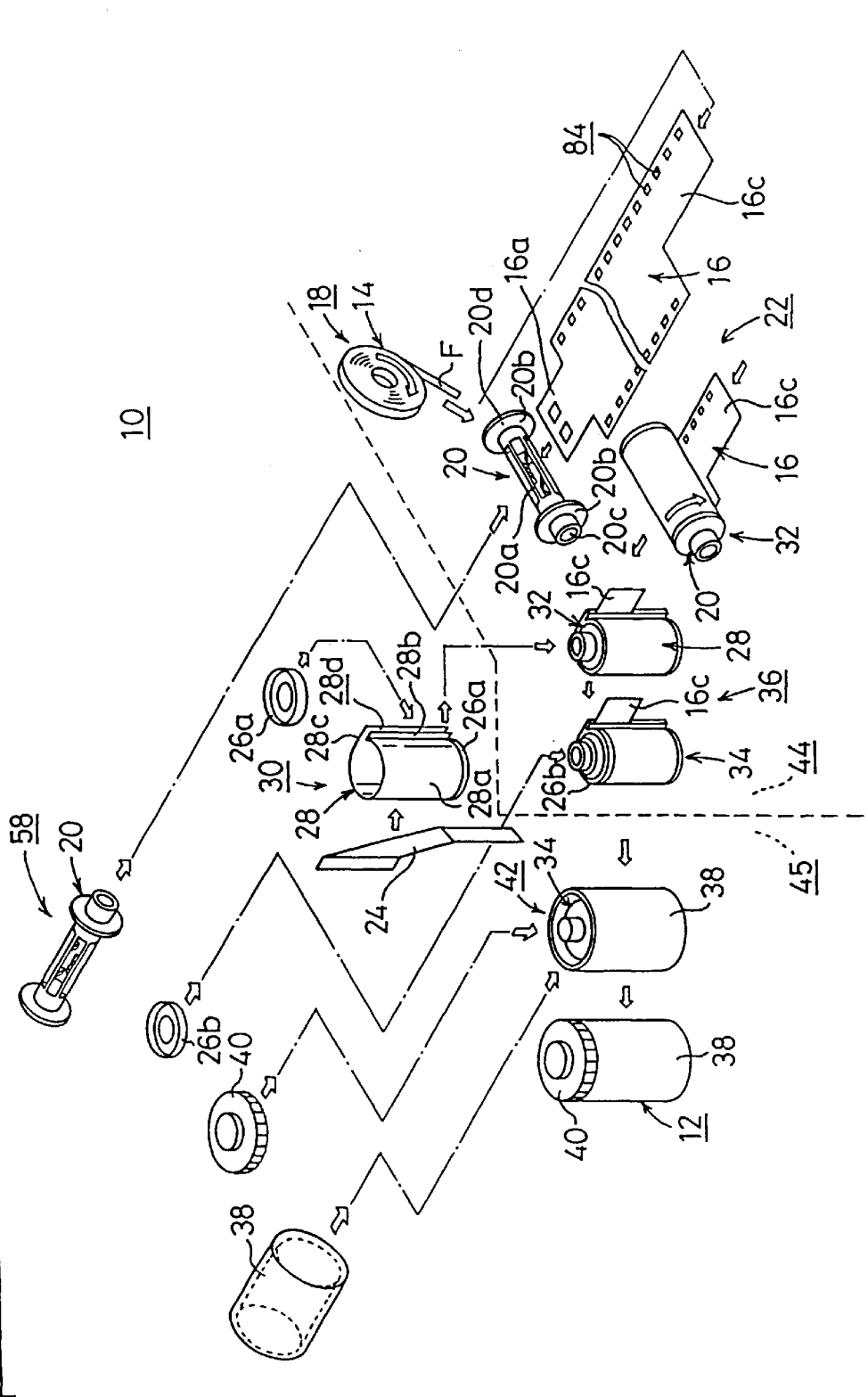
FIG. 1 is a schematic perspective view illustrative of a process of manufacturing a packaged product with a film cartridge manufacturing apparatus according to an embodiment of the present invention.

FIG. 1 illustrates in schematic perspective the manner in which a packaged product 12 is manufactured by a film cartridge manufacturing apparatus 10 according to the present invention. The film cartridge manufacturing apparatus 10 is shown in plan and side elevation in FIGS. 2 and 3, respectively.

Figure 2:
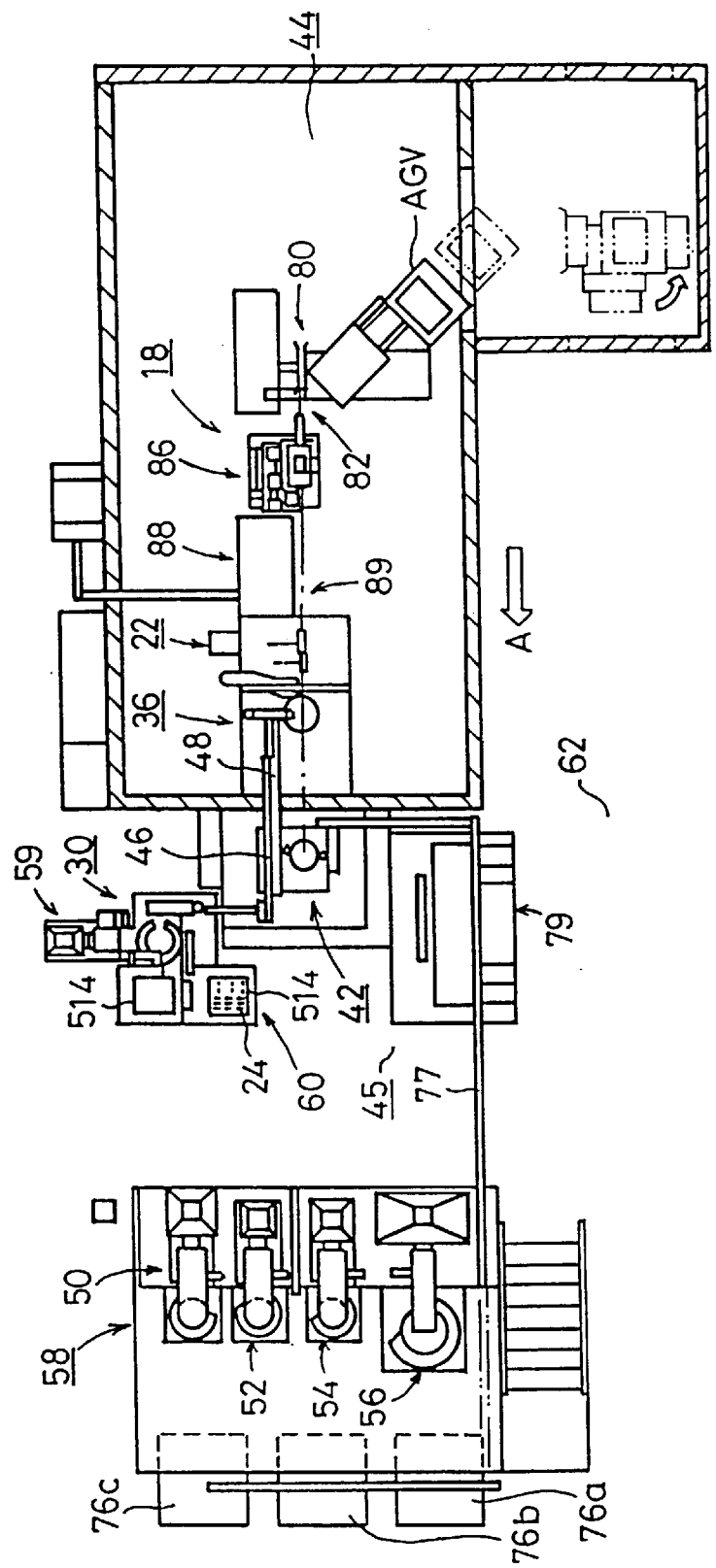
FIG. 2 is a schematic plan view, partly in cross section, of the film cartridge manufacturing apparatus.
Figure 3:
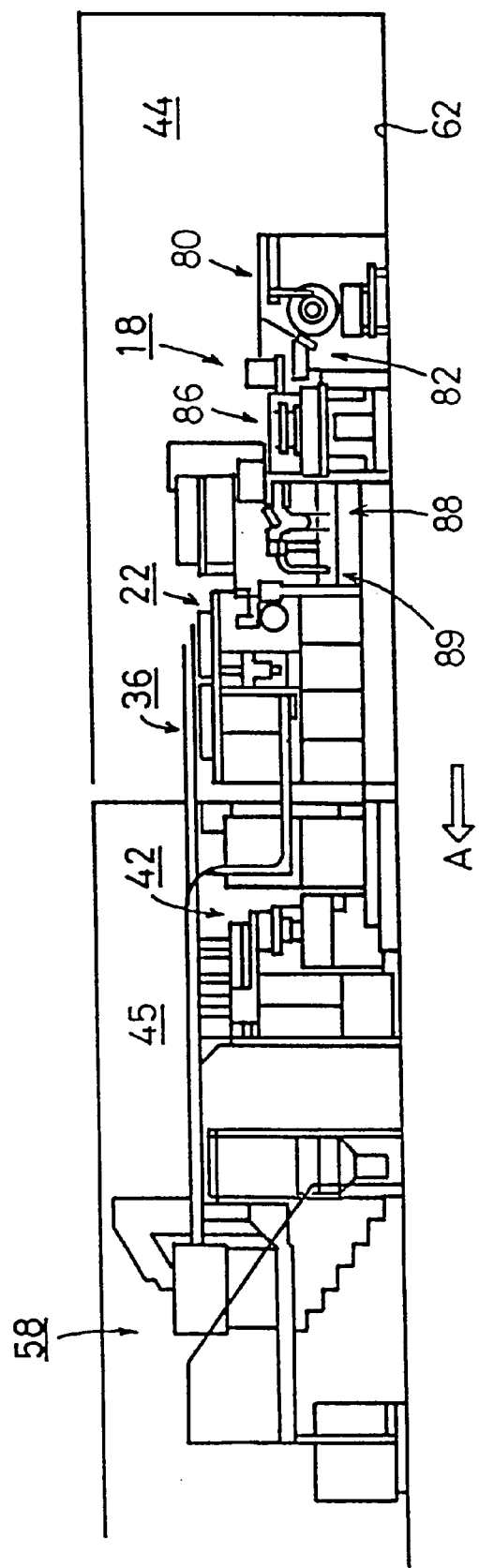
FIG. 3 is a schematic side elevational view of the film cartridge manufacturing apparatus.

As shown in FIGS. 1 through 3, the film cartridge manufacturing apparatus 10 generally comprises a film supply unit 18 for unwinding a film roll 14 of elongate photographic photosensitive film F (hereinafter referred to as "elongate film F"), cutting the unwound elongate film F into a film 16 of given length, and supplying the film 16, a film coiling unit 22 for positioning a spool 20 and the film 16 relatively to each other and winding the film 16 on the spool 20, a cartridge producing unit 30 for rounding a cartridge blank sheet 24 into a tubular form and clinching a cap 26a on one end of the tubular form thereby to produce a cartridge 28 with one open end (also referred to as "single-open-ended cartridge 28"), an assembling unit 36 for inserting a film coil 32, which is made up of the film 16 wound on the spool 20, into the cartridge 28 through the open end thereof, and then clinching another cap 26b on the open end of the cartridge 28 thereby to produce an assembled film cartridge 34, and an encasing unit 42 for placing the film cartridge 34 into a case 38 and attaching a case cap 40 to an open end of the case 38 thereby to produce a packaged product 12. The film supply unit 18, the film coiling unit 22, and the assembling unit 36 are housed in a dark chamber 44, and other devices, i.e., the encasing unit 42, etc. are housed in a bright chamber 45.

As shown in FIG. 1, the cartridge 28 with one open end has a folded edge 28b on one end of a circumferential wall 28a thereof and a straight edge 28d on the other end of the circumferential wall 28a. The cartridge 28 also has an axially extending port 28d defined between the folded edge 28b and the straight edge 28d.

As shown in FIG. 2, the film supply unit 18, the film coiling unit 22, the assembling unit 36, and encasing unit 42 are arrayed in line with each other along a film producing and packaging process as indicated by the arrow A. Between the dark chamber 44 and the bright chamber 45, there extend a first straight feed path 46 for delivering cartridges 28 from the cartridge producing unit 30 to the assembling unit 36 and a second straight feed path 48 for delivering assembled film cartridges 34 from the assembling unit 36 to the encasing unit 42.

Downstream of the film producing and packaging process, there is disposed a parts supply apparatus 58 comprising a spool supply unit 50 for supplying spools 20 to the film coiling unit 22, a cap supply unit 52 for supplying caps 26b to the assembling unit 36, a case cap supply unit 54 for supplying case caps 40 to the encasing unit 42, and a case supply unit 56 for supplying cases 38 to the encasing unit 42. The spool supply unit 50, the cap supply unit 52, the case cap supply unit 54, and the case supply unit 56 are closely positioned in the housing of the parts supply apparatus 58. A cap supply unit 59 for supplying caps 26a and a cartridge blank sheet supply unit 60 for supplying cartridge blank sheets 24 are disposed near the cartridge producing unit 30.

Packaged product accumulating units 76a, 76b, 76c are disposed near the parts supply apparatus 58. The packaged product accumulating units 76a, 76b, 76c and the encasing unit 42 are coupled to each other by a conveyor 77 which is associated with a semifinished product accumulating unit 79.

Figure 4:
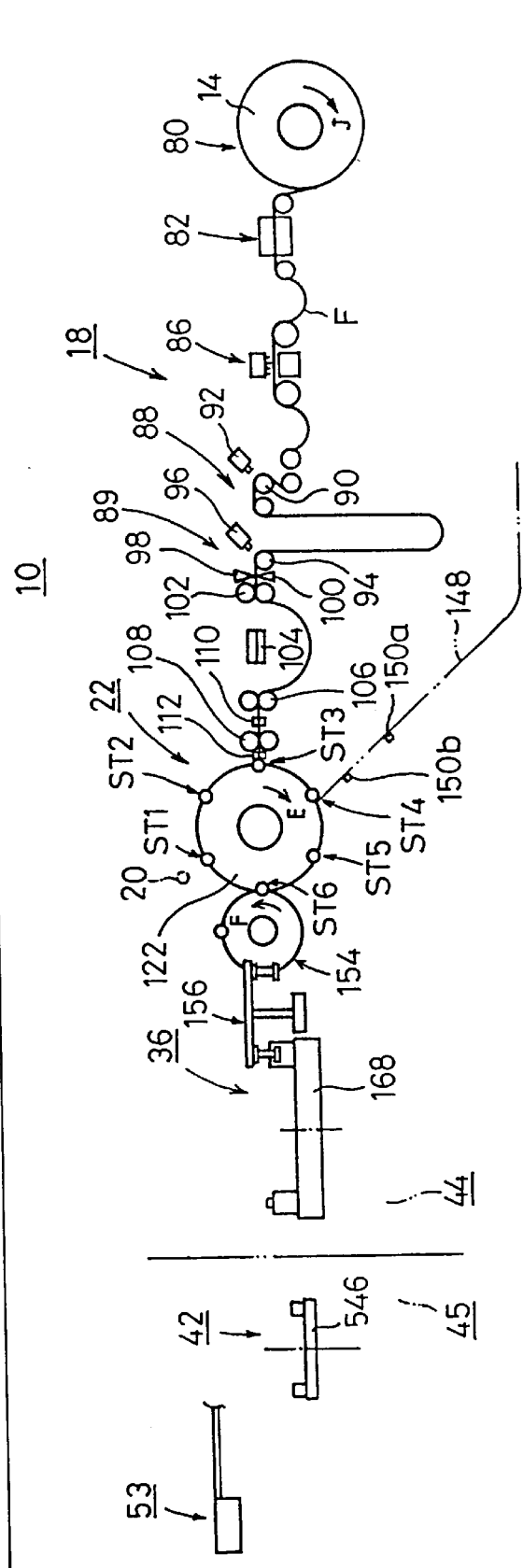
FIG. 4 is a schematic side elevational view of a succession of units ranging from a film supply unit to an assembling unit.

As shown in FIG. 4, the film supply unit 18 comprises a feeder 80 for holding and unwinding a film roll 14, a splicer 82 for splicing a trailing end of the film roll 14 to a starting end of a new film roll 14, a perforator 86 forming perforations 84 (see FIG. 1) in opposite longitudinal sides of an elongate film F unwound from the film roll 14, a side printer 88 for printing latent image data on one or both of the sides of the elongate film F, and a cutter 89 for cutting off the elongate film F to films 16 of given length.

The side printer 88 comprises a first printing mechanism 92 disposed in confronting relationship to a constant-speed-feed path roller 90 and a second printing mechanism 96 disposed in confronting relationship to a constant-length-feed sprocket wheel 94. The first printing mechanism 92 records a belt-shaped print depending on the type of the film as a latent image on one or both sides of elongate films F, and the second printing mechanism 96 records a DX bar code, frame numbers, frame number bar codes, a commercial name, depending on the size of the film as latent images on one or both sides of elongate films F.

The cutter 89 comprises a movable blade 98 and a fixed blade 100 which are disposed in vertically spaced and confronting relationship to each other, and cuts the elongate film F to a predetermined length as a sized film 16 depending on the desired size of the film 16. Downstream of the cutter 89, there are disposed end feed nip rollers 102, an openable and closable guide 104, insertion roller pairs 106, 108, and guide plates 110, 112. The openable and closable guide 104 is retractable out of the film feed path. A suction discharger (not shown) is disposed below the openable and closable guide 104.

Figure 5:
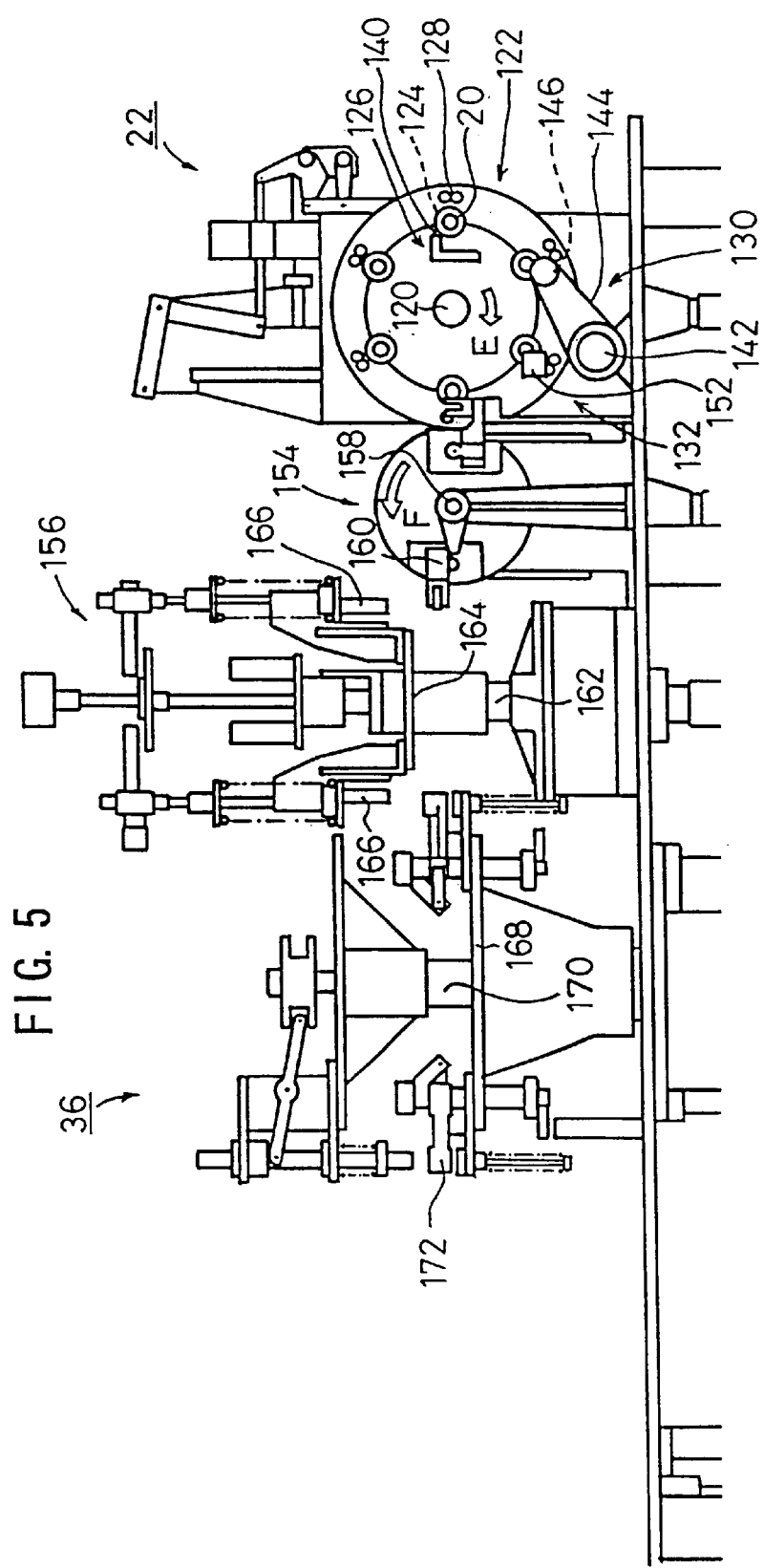
FIG. 5 is a side elevational view of a film coiling unit and the assembling unit.

As shown in FIG. 5, the film coiling unit 22 comprises a turntable 122 fixed to a main shaft 120 rotatable in the direction indicated by the arrow E, a plurality of, e.g., six, spool chucks 124 mounted at equal angular intervals on the turntable 122, a spool positioner 126 for positioning spools 20 held by the spool chucks 124, a plurality of nip rollers 128 for pressing sized films 16 with their leading ends 16a inserted in the spools 20, a prewinder 130 for prewinding the sized films 16, and a winder 132 for winding the sized films 16 which have been prewound by the prewinder 130.

As shown in FIG. 4, the turntable 122 has thereon a spool supply station ST1, a spool positioning station ST2, an inserting station ST3, a prewinding station ST4, a winding station ST5, and a transfer station ST6 which are successively angularly positioned clockwise (in the direction indicated by the arrow E) in the order named. The turntable 122 is associated with a self-locking brake (not shown) for preventing the spools 20 from rotating.

Figure 6:
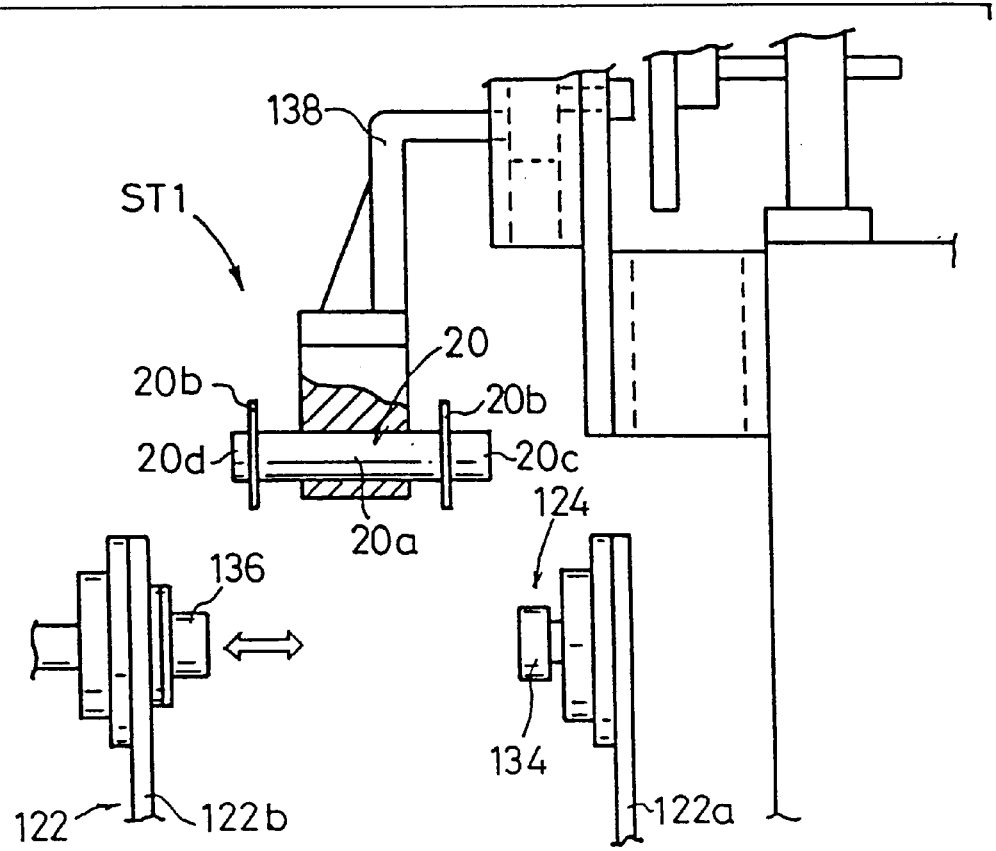
FIG. 6 is a view of a spool chucking unit of the film coiling unit.

As shown in FIG. 6, the turntable 122 has a pair of rotary plates 122a, 122b. The spool chucks 124 have respective fixed chucks 134 mounted on the rotary plate 122a and respective movable chucks 136 mounted on the other rotary plate 122b for movement in the directions indicated by the arrow and biased by springs (not shown). In the spool supply station ST1, a spool 20 is inserted between the fixed chuck 134 and the movable chuck 136 of one spool chuck 124 by a vertically movable support arm 138.

As shown in FIG. 5, the spool positioner 126 has a pawl 140 which is held against the spool 20 supported by the spool chuck 124 by a spring, a cylinder, or the like (not shown) while the spool 20 is rotating. The spool 20 is rotated through a clutch, and the pawl 140 engages in a step of the spool 20.

The prewinder 130 has a prewinding motor 142 that is operatively coupled to a main shaft 146 by a belt and pulley mechanism 144. The main shaft 146 has a touch roller (not shown) that contacts the movable chuck 136 of the spool chuck 134 to rotate the spool 20 at a constant speed.

As shown in FIG. 4, a film guide 148 extends toward the prewinding station ST4, and is associated with first and second photosensors 150a, 150b spaced from each other along the film guide 148. When a tongue 16c at the trailing end of a sized film 16 prewound on a spool 20 in the prewinding station ST4 passes across the first photosensor 150a, the prewinder 130 is decelerated. When the same tongue 16c passes across the second photosensor 150b, the prewinder 130 is stopped.

As shown in FIG. 5, the winder 132 has a winding motor 152 that can be coupled coaxially to a chuck drive shaft of one spool chuck 124 by a clutch or the like (not shown).

A first transfer unit 154 and a second transfer unit 156 are disposed downstream of the film coiling unit 22. The first transfer unit 154 receives a film coil 32, which comprises a sized film 16 wound on a spool 20, from one of the spool chucks 124, and converts the film coil 32 from a horizontal attitude to a vertical attitude while making a 180° turn about its own axis. The first transfer unit 154 comprises a rotatable shaft 158 and a holder 160 rotatable by the rotatable shaft 158 in the direction indicated by the arrow F.

The second transfer unit 156 comprises a turntable 164 supported by a vertical rotatable shaft 162 and rotatable about a vertical axis by the vertical rotatable shaft 162. A plurality of vertically movable grips 166 are mounted on the turntable 164. The second transfer unit 156 inserts a film coil 32 received from the first transfer unit 154 into a single-open-ended cartridge 28 placed on an index table 168 of the assembling unit 36.

Figure 7:
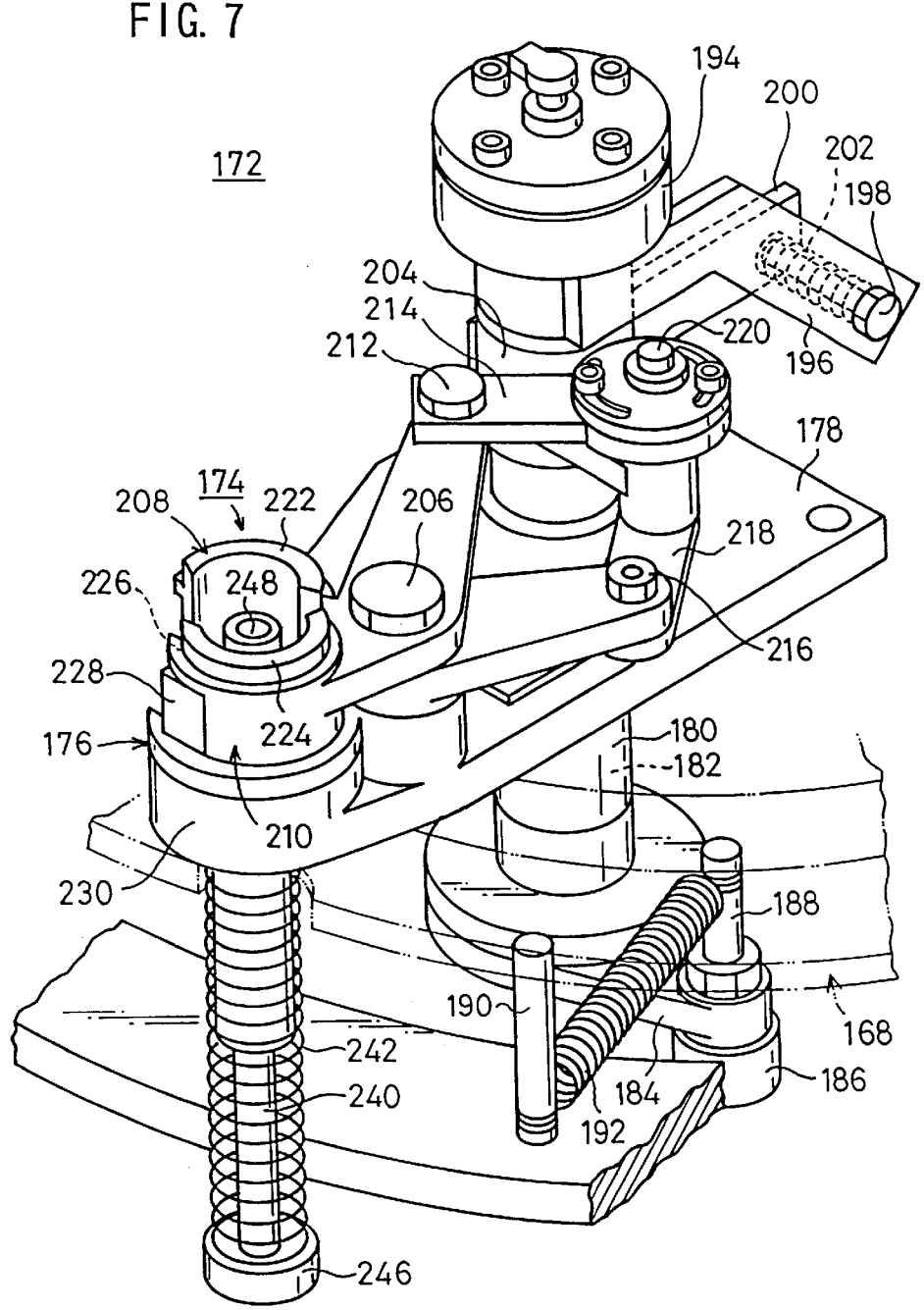
FIG. 7 is a perspective view of a cartridge positioning and holding mechanism.
Figure 8:
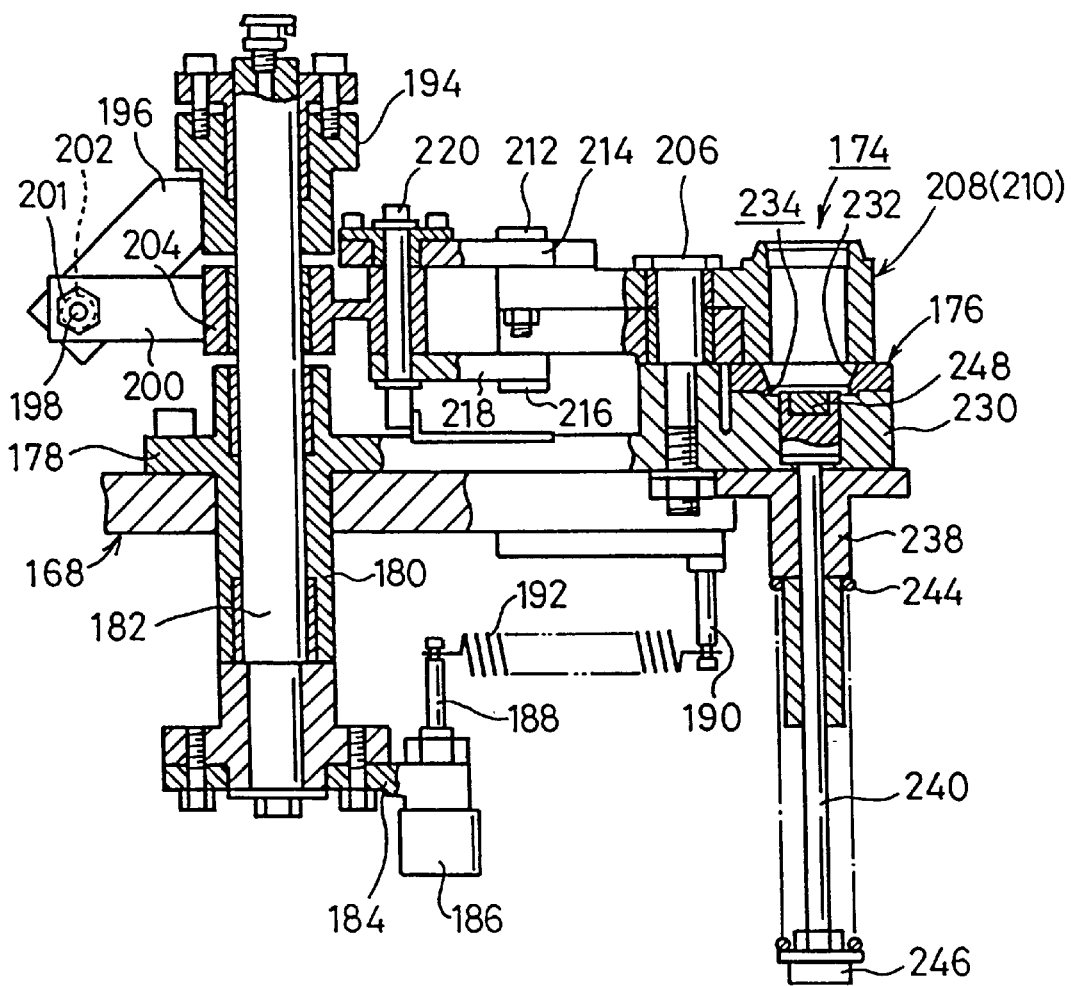
FIG. 8 is a side elevational view, partly in cross section, of the cartridge positioning and holding mechanism.

The index table 168 is fixedly mounted on a vertical rotatable shaft 170 for indexing movement to 12 angularly spaced positions. Cartridge positioning and holding mechanisms 172 are mounted on the index table 168 for positioning and holding single-open-ended cartridges 28 in the respective angularly spaced positions. As shown in FIGS. 7 and 8, each of the cartridge positioning and holding mechanisms 172 comprises an openable and closable movable chuck 174 for forming and holding the outer circumferential wall of a single-open-ended cartridge 28 and a fixed guide 176 for guiding the cap 26a side of the single-open-ended cartridge 28.

The cartridge positioning and holding mechanism 172 has a base 178 fastened by screws to an outer circumferential end of the index table 168. A tubular body 180 extends vertically downwardly from the base 178 through the index table 168. A angularly movable shaft 182 is angularly movably disposed in the tubular body 180, and a cam roller 186 is mounted on the lower end of the angularly movable shaft 182 by an arm 184. A spring 192 is connected between a shaft 188 disposed coaxially with the cam roller 186 and a shaft 190 mounted on a bottom surface of the index table 168. The spring 192 pulls the cam roller 186 to keep the movable chuck 174 open.

A stepped tubular body 194 is fixed to an upper portion of the angularly movable shaft 182. A first arm 196 has an end fixed to the stepped tubular body 194 and an opposite end through which a bolt 198 extends. The bolt 198 extends through an end of a second arm 200, and a nut 201 is threaded over the tip end of the bolt 198. A spring 198 is disposed around the bolt 198 between the first arm 196 and the second arm 200. The second arm 200 has its opposite end fixed to a tubular angularly movable member 204 of the movable chuck 174.

Figure 9:
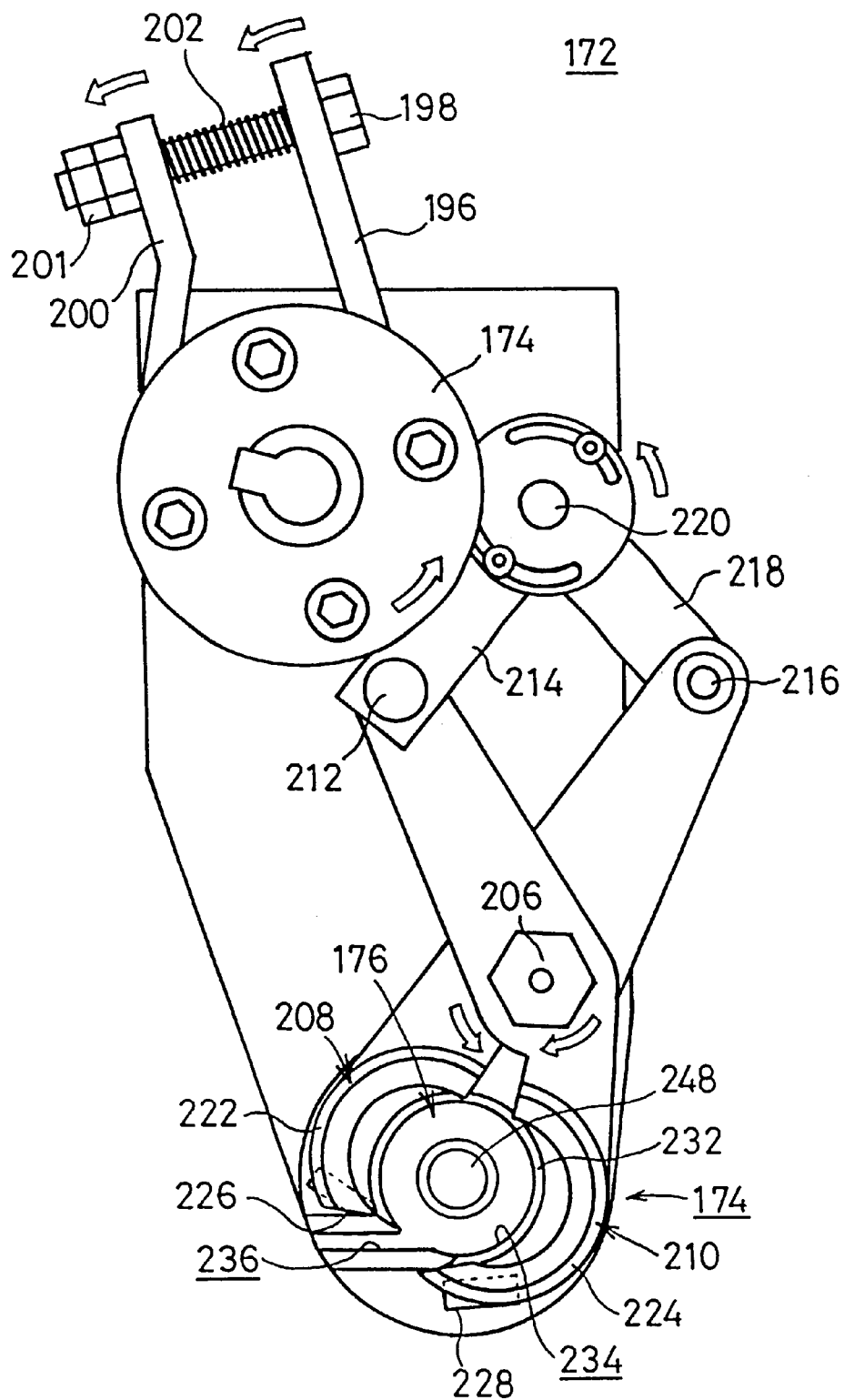
FIG. 9 is a plan view of the cartridge positioning and holding mechanism.

As shown in FIGS. 7 through 9, in order to grip the folded edge 28b and the straight edge 28c of the single-open-ended cartridge 28 to form and hold the single-open-ended cartridge 28, the movable chuck 174 has a folded-edge chuck 208 and a straight-edge chuck 210 that are openable and closable about a fixed shaft 206, a folded-edge arm 214 angularly movably coupled to the folded-edge chuck 208 by a first support shaft 212, a straight-edge arm 218 angularly movably coupled to the straight-edge chuck 210 by a second support shaft 216, and an angularly movable member 204 integrally joined to the folded-edge arm 214 and the straight-edge arm 218 by a third support shaft 220.

Figure 10:
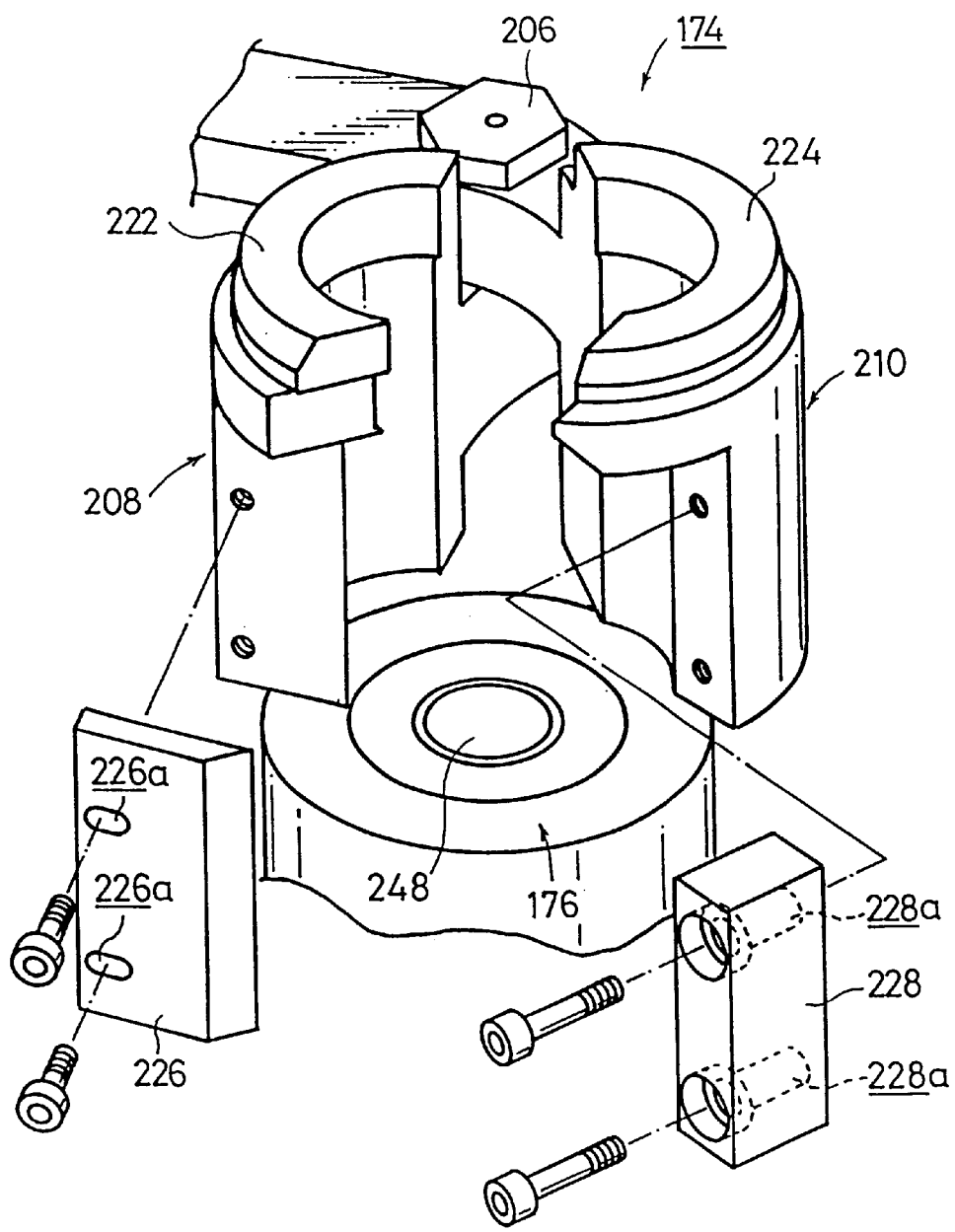
FIG. 10 is a fragmentary exploded perspective view of the cartridge positioning and holding mechanism.

The folded-edge chuck 208 and the straight-edge chuck 210 have respective semicircular rings 222, 224 respectively on their upper ends. When the semicircular rings 222, 224 are closed, i.e., moved toward each other, their end faces contact each other, jointly making up a cylindrical space between the semicircular rings 222, 224. Forming members 226, 228 that are complementary in shape to the folded edge 28b and the straight edge 28c, respectively, are fixed to the respective openable and closable end faces of the folded-edge chuck 208 and the straight-edge chuck 210 and spaced axially a predetermined distance from the rings 222, 224. As shown in FIG. 10, the forming members 226, 228 have oblong attachment holes 226a, 228a.

The base 178 includes a boss 230 on a distal end thereof, with the fixed guide 176 secured to the upper surface of the boss 230. The fixed guide 176 is substantially in the form of a ring, and has an upper tapered surface 232 for centering a single-open-ended cartridge 28. The fixed guide 176 has a hole 234 defined in a smallest-diameter portion of the tapered surface 232 and having a diameter corresponding to the diameter of the cap 26a of the single-open-ended cartridge 28. The fixed guide 176 has a groove 236 extending radially outwardly from the hole 234 for passing the tongue 16c of the film coil 32 therethrough (see FIG. 9).

A support tube 238 is fixed to the boss 230, and a vertically movable rod (movable member) 240 is axially movably disposed in the support tube 238. The vertically movable rod 240 is held at a predetermined height by a stopper (not shown), and a spring 244 is disposed around the vertically movable rod 240. The spring 244 is supported on a large-diameter flange 246 on the lower end of the vertically movable rod 240. The vertically movable rod 240 is vertically movable through the boss 230 and the fixed guide 176, and supports on its tip end a magnet 248 for attracting the cap 26a of the single-open-ended cartridge 28.

Figure 11:
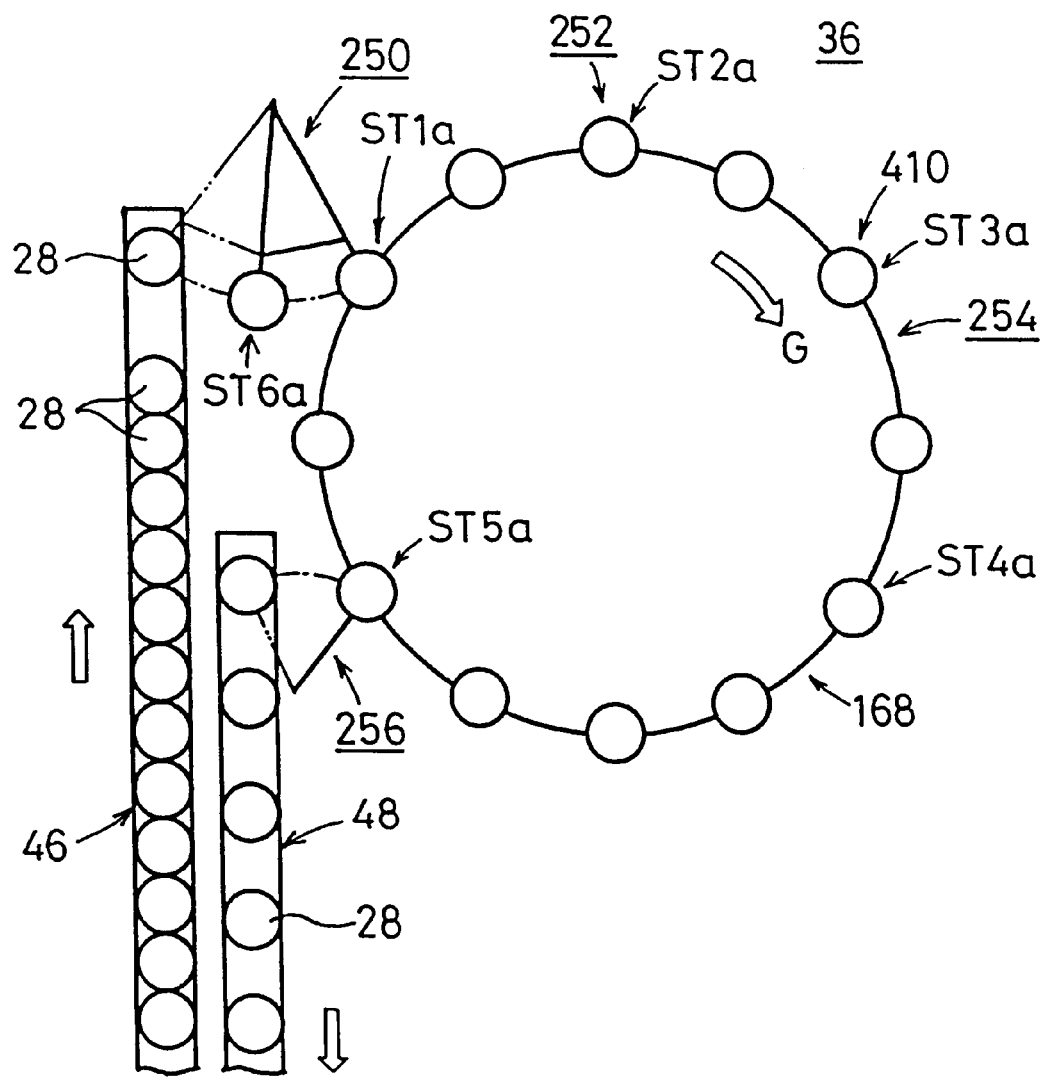
FIG. 11 is a schematic plan view of the assembling unit.

As shown in FIG. 11, when the index table 168 is rotated in the direction indicated by the arrow G. it can successively be indexed to a single-open-ended cartridge supply station ST1a, a film-wound spool inserting station ST2a, a cap supply station ST3a, a cap clinching station ST4a, a film cartridge discharging station ST5a, and other stations.

The single-open-ended cartridge supply station ST1a is associated with a positioning and inserting mechanism 250 for rotating a single-open-ended cartridge 28 fed at a desired attitude along the first straight feed path 46 about the cartridge axis to position the single-open-ended cartridge 28 in a circumferential direction, and thereafter inserting the single-open-ended cartridge 28 into the cartridge positioning and holding mechanism 172. The film-wound spool inserting station ST2a is associated with a film coil inserting mechanism 252 for inserting a film coil 32 into the single-open-ended cartridge 28. The cap supply station ST3a and the cap clinching station ST4a are associated with a cap loading mechanism 254 for supplying a cap 26b to an open end of the single-open-ended cartridge 28 and clinching the cap 26b to produce a film cartridge 34. The film cartridge discharging station ST5a is associated with a film cartridge removing mechanism 256 for removing the film cartridge 34 from the cartridge positioning and holding mechanism 172 and feeding the removed film cartridge 34 to the second straight feed path 48.

Figure 12:
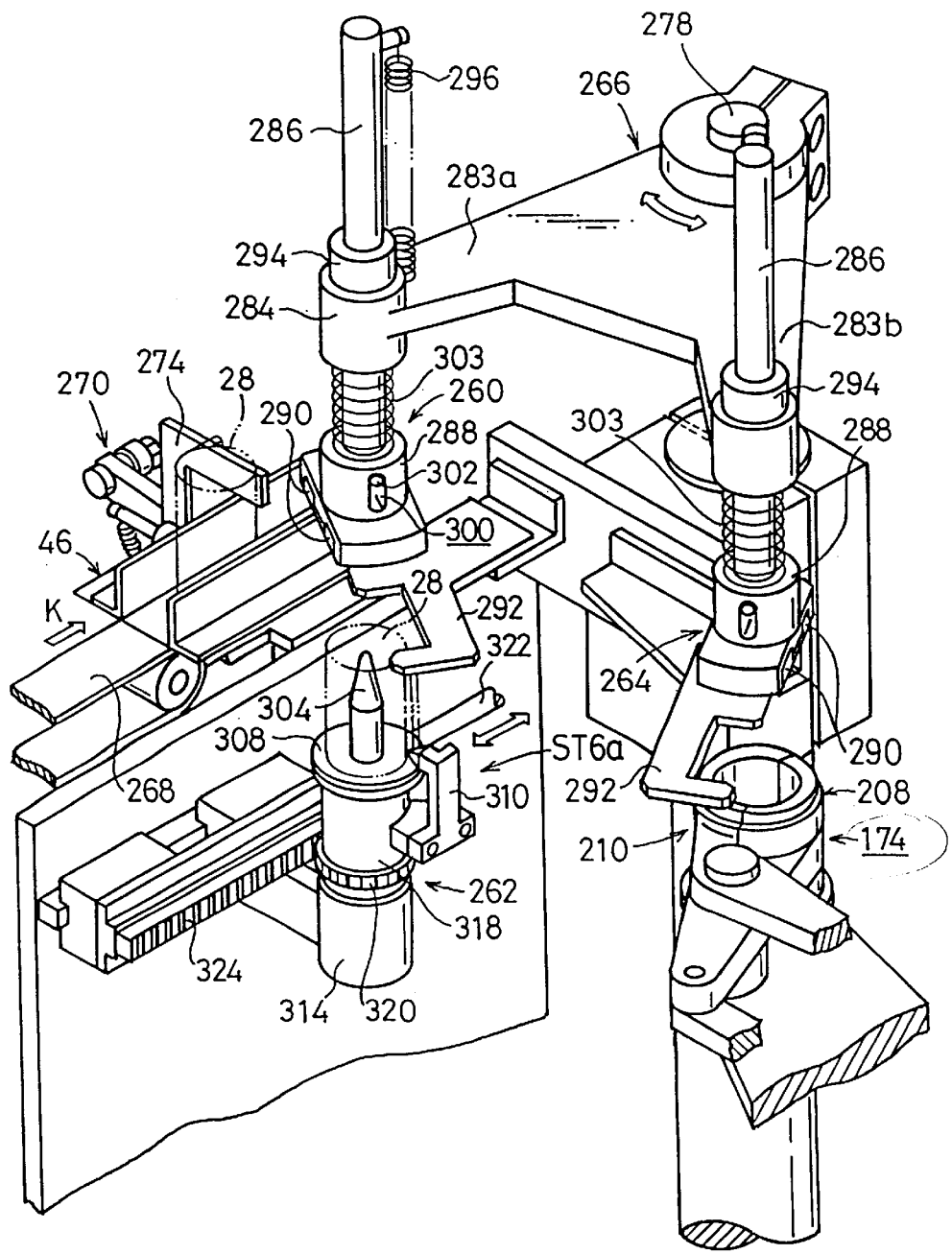
FIG. 12 is a perspective view of a positioning and inserting mechanism.
Figure 13:
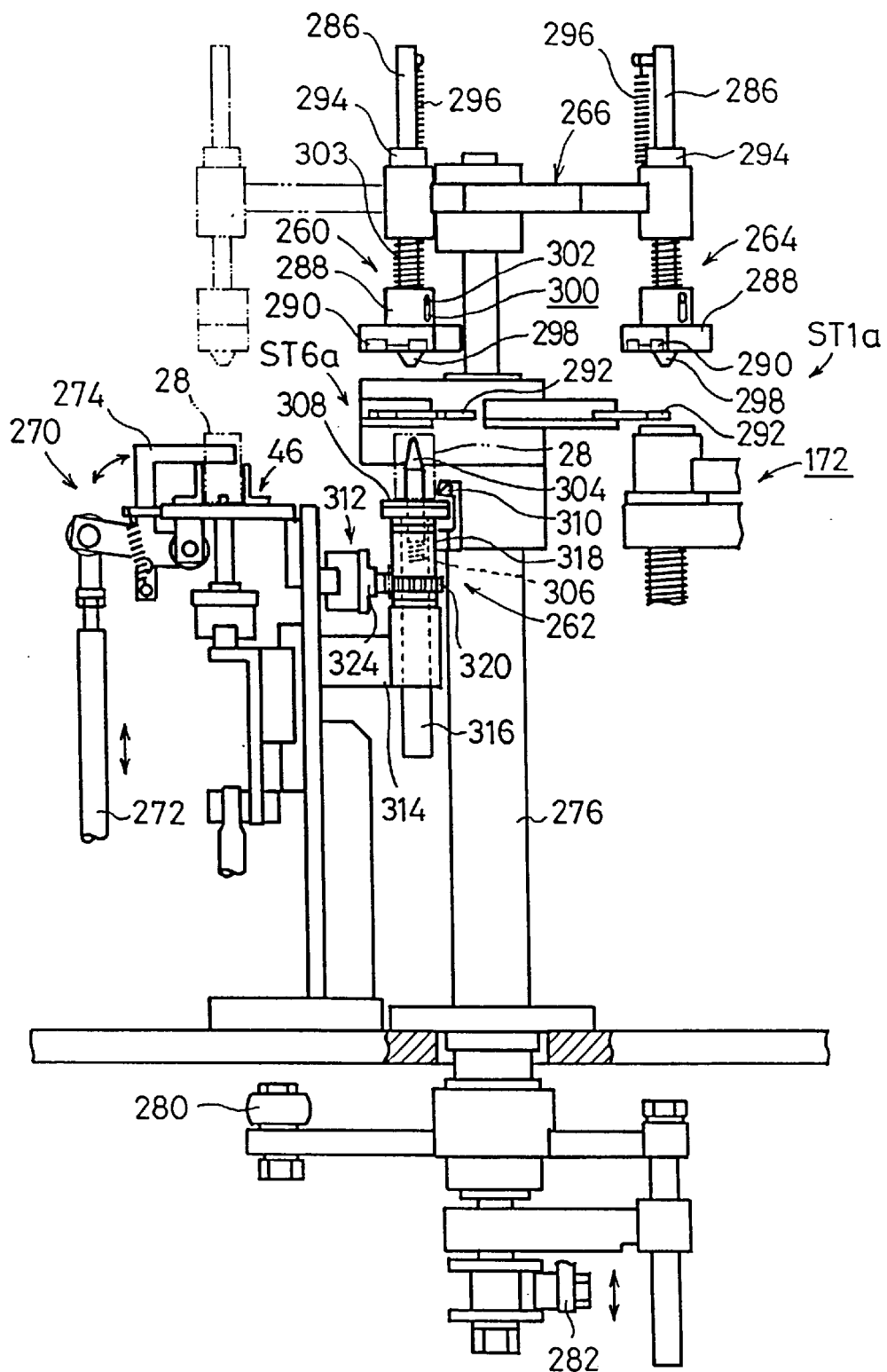
FIG. 13 is a front elevational view of the positioning and inserting mechanism.
Figure 14:
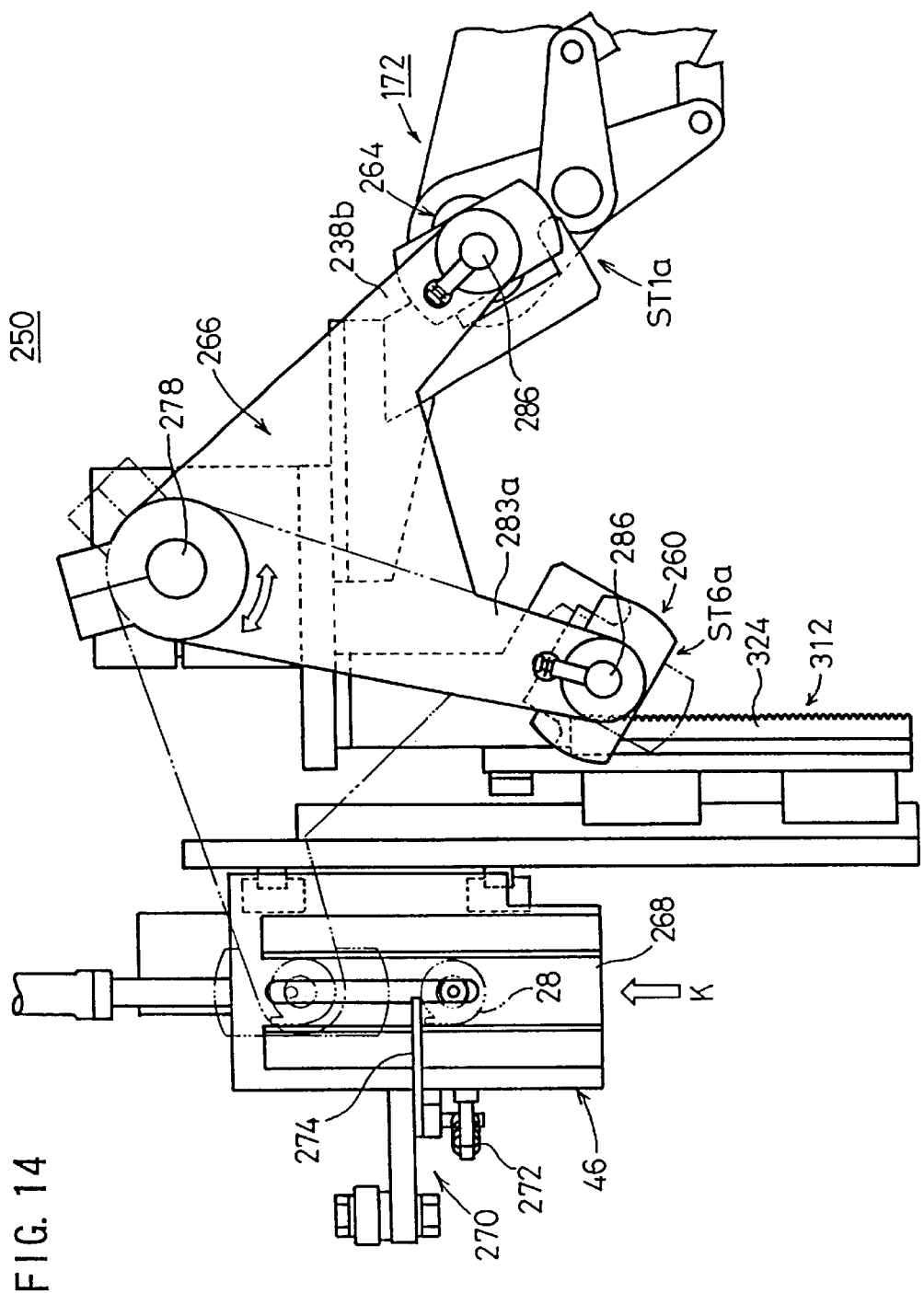
FIG. 14 is plan view of the positioning and inserting mechanism.

As shown in FIGS. 12 through 14, the positioning and inserting mechanism 250 has a first delivering unit 260 for holding a single-open-ended cartridge 28 on the first straight feed path 46 and placing the single-open-ended cartridge 28 in the positioning station ST6a, a positioning unit 262 for rotating the single-open-ended cartridge 28 about the cartridge axis in the positioning station ST6a to position the single-open-ended cartridge 28 in a circumferential direction, a second delivering unit 264 for inserting the single-open-ended cartridge 28 positioned in the positioning station ST6a into the cartridge positioning and holding mechanism 172, and a moving mechanism 266 for displacing the first and second delivering unit 260, 264 in unison with each other.

The first straight feed path 46 comprises a conveyor 268 for feeding a single-open-ended cartridge 28 in a predetermined attitude in the direction indicated by the arrow K. A stopper 270 is combined with the conveyor 268 and has an engaging member 274 that is swingable by a cylinder 272 into and out of the path of the single-open-ended cartridge 28 on the conveyor 268.

The moving mechanism 266 has a support tube 276 in which a drive shaft 278 is rotatably and vertically movably supported. As shown in FIG. 13, the drive shaft 278 has a lower portion combined with a first cam 280 for rotating the drive shaft 278 and a second cam 282 for vertically moving the drive shaft 278. The drive shaft 278 has an upper portion combined with a first arm 283a and a second arm 283b on which the first delivering unit 260 and the second delivering unit 264 are mounted, respectively.

As shown in FIGS. 12 and 13, the first delivering unit 260 comprises a pusher 286 axially movably inserted in a guide 284 of the first arm 283a, magnets 290 movably mounted on the lower end of the pusher 286 by a holder 288, for attracting the open end of the single-open-ended cartridge 28, and a stopper 292 for holding the magnets 290 in a predetermined position in order to push the single-open-ended cartridge 28 attracted by the magnets 290 with the pusher 286.

The pusher 286 has a large-diameter collar 294 on its intermediate portion which is supported in abutment by an upper surface of the guide 284. A spring 296 is connected between the upper end of the pusher 286 and the guide 284. The pusher 286 has a conical point 298 on its lower end. The holder 288 is vertically movable a predetermined stroke that is defined by a oblong 300 defined axially in a side wall of the holder 288 and a pin 302 disposed in the oblong 300 and fixed to the pusher 286. A spring 303 is interposed between the holder 288 and the guide 284. The second delivering unit 264 is of a structure identical to the first delivering unit 260. Those parts of the second delivering unit 264 which are identical to those of the first delivering unit 260 are denoted by identical reference characters, and will not be described in detail below.

The positioning unit 262 comprises a tapered guide 304 insertable in a single-open-ended cartridge 28 for centering the single-open-ended cartridge 28, a magnet 308 movable relatively to the tapered guide 304 through a spring (resilient member) 306, for attracting the cap 26a side of the single-open-ended cartridge 28, a finger 310 for engaging the single-open-ended cartridge 28 attracted by the magnet 308, and an actuator 312 for rotating the finger 310 in the circumferential direction of the single-open-ended cartridge 28. The magnet 308 have an attractive force that is smaller than the attractive force of the magnets 290.

As shown in FIGS. 12 and 13, the positioning unit 262 also has a base 314 on which a support post 316 is vertically mounted. The sheet-like magnet 308 are mounted on an upper portion of the support post 316. The tapered guide 304 is movably disposed in the support post 316 through the spring 306. A rotary ring 318 is disposed around the support post 316. The finger 310 is fixed to the rotary ring 318. A pinion 320 is fixed to the outer circumferential surface of the rotary ring 318 and held in mesh with a rack 324 connected to a drive cam 322.

Figure 15:
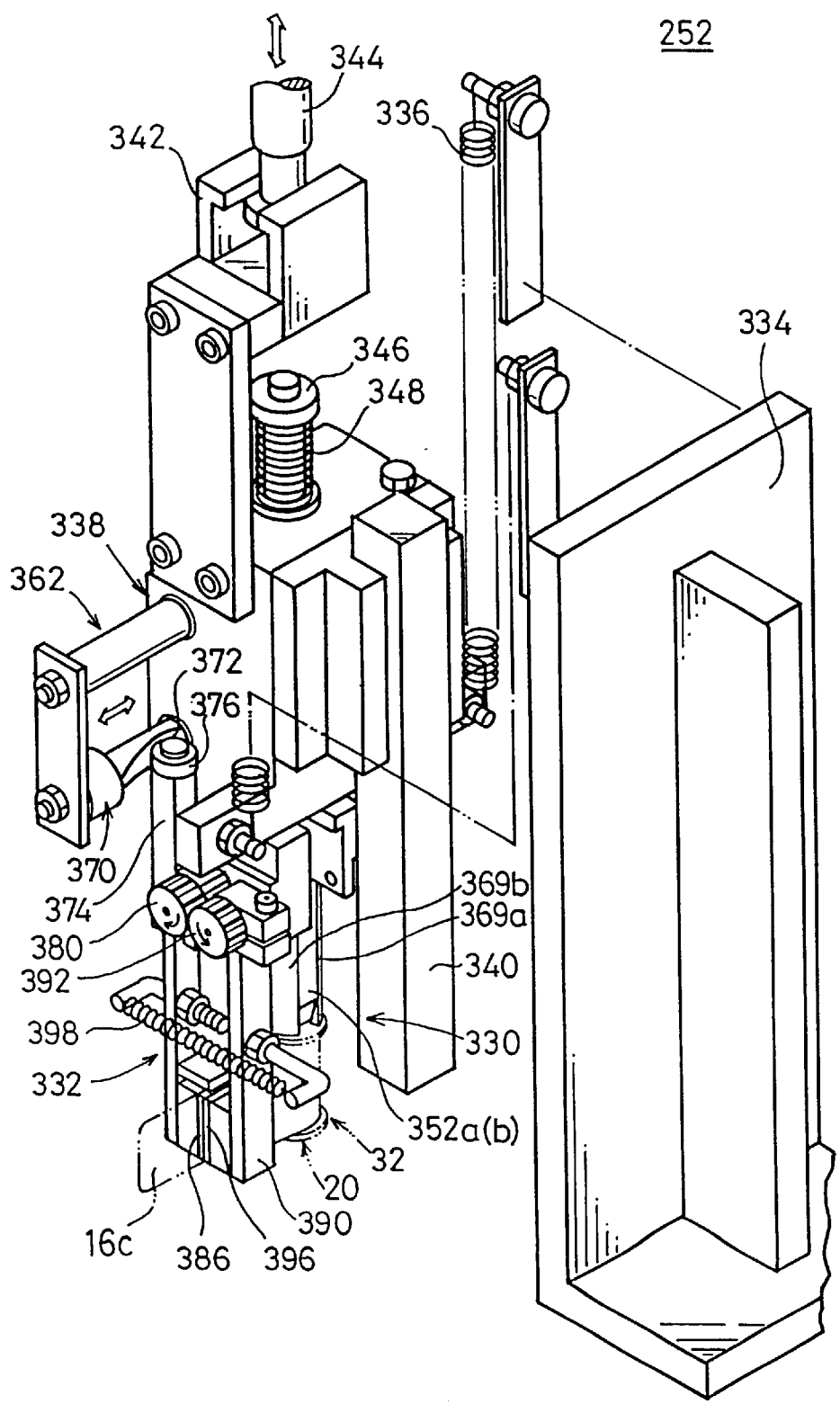
FIG. 15 is a perspective view of a film coil inserting mechanism.
Figure 16:
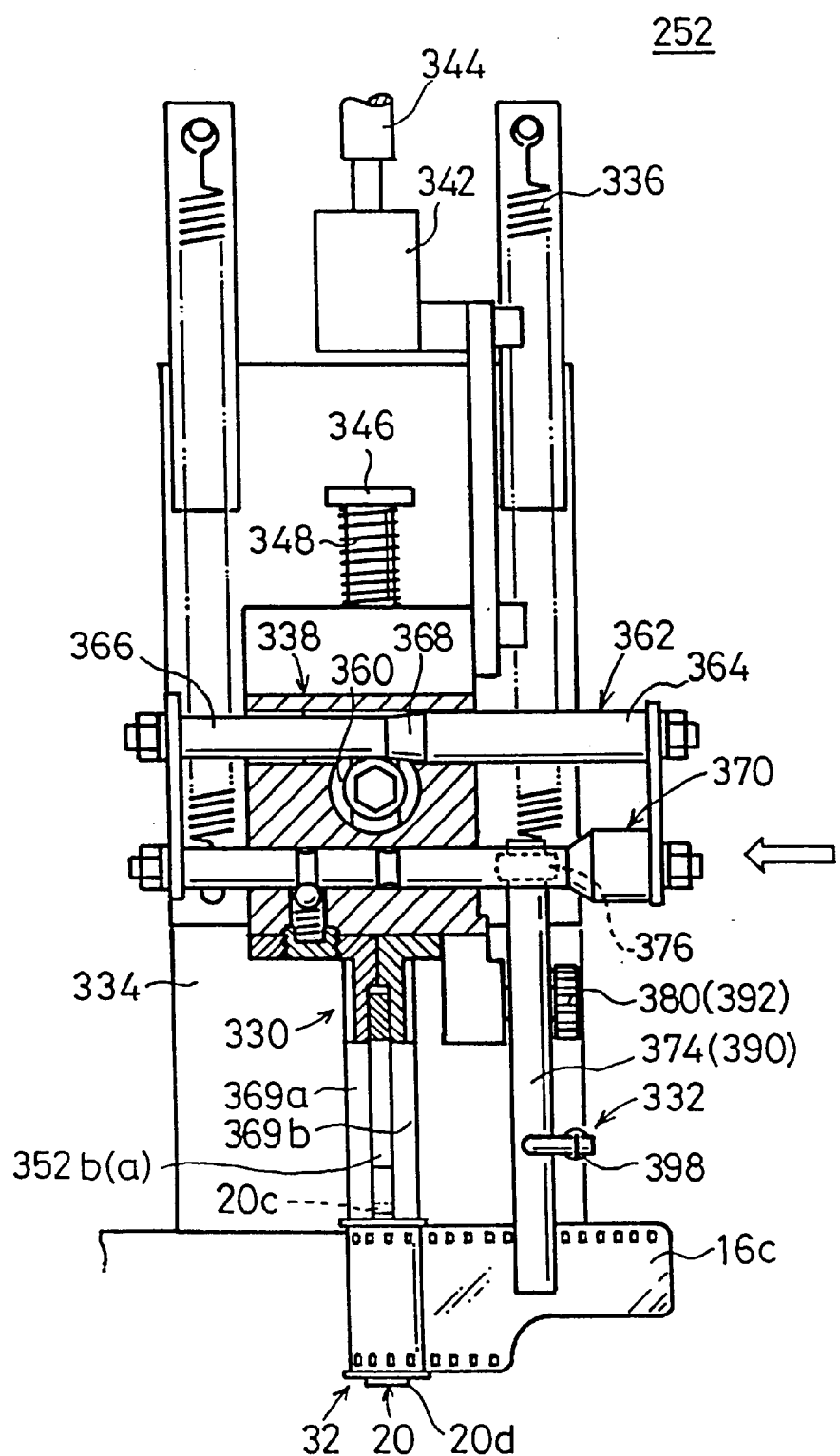
FIG. 16 is a front elevational view of the film coil inserting mechanism.

As shown in FIGS. 15 and 16, the film coil inserting mechanism 252 comprises a spool chuck 330 for holding a long boss 20c of the spool 20 of a film coil 32, and an openable and closable tongue chuck 332 for gripping the tongue 16c of the film 16 of the film coil 32. The film coil inserting mechanism 252 has a fixed frame 334 which supports an end of a spring 336 whose other end (lower end) engages a vertically movable main body 338. The vertically movable main body 338 is supported on the fixed frame 334 for vertical movement along a guide rail 340. An engaging member 342 is fixed to a side of the vertically movable main body 338 and engaged by a vertically movable cam 344.

Figure 17:
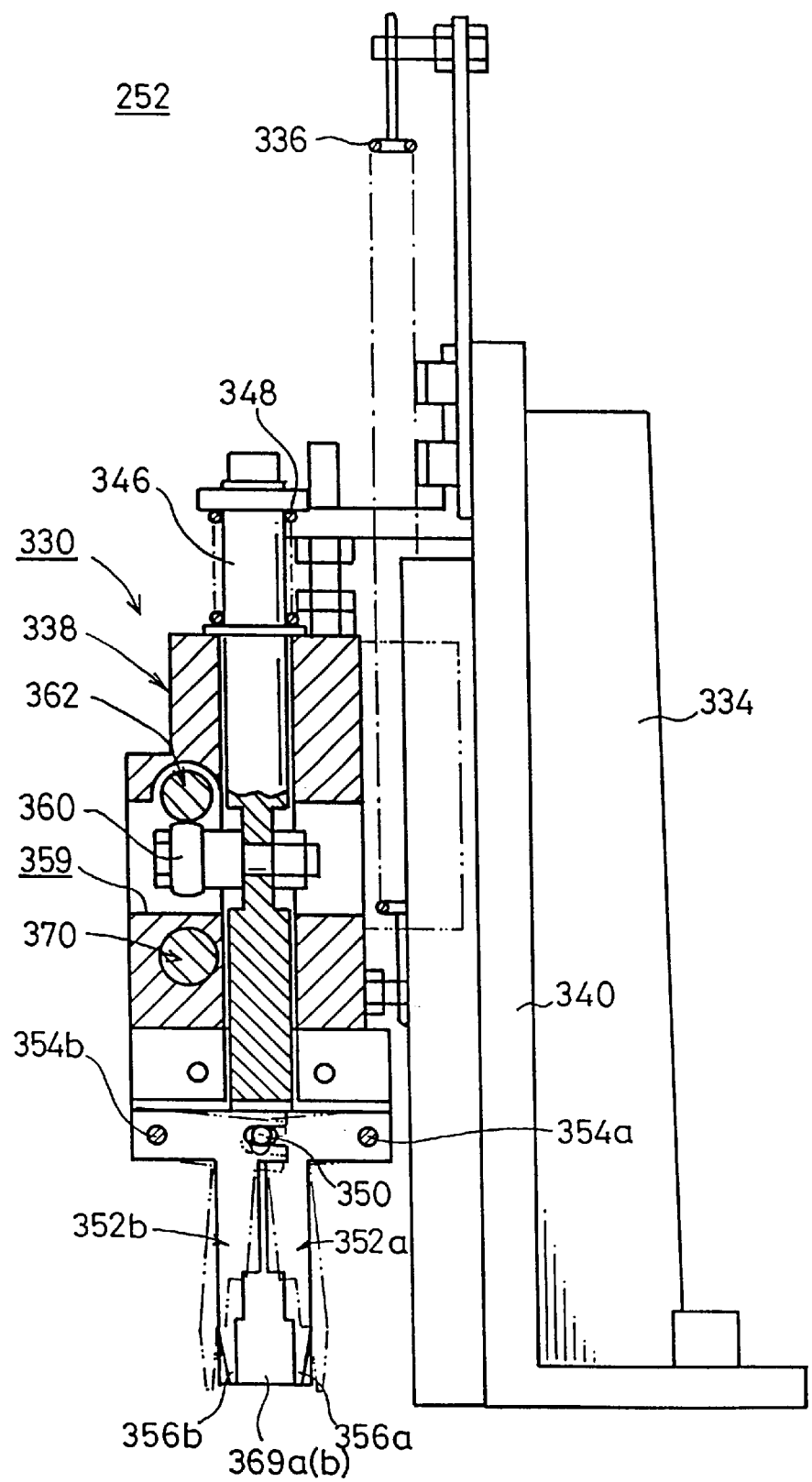
FIG. 17 is a side elevational view, partly in cross section, of the film coil inserting mechanism.

The spool chuck 330 has an opening and closing rod 346 extending vertically through the vertically movable main body 338. The opening and closing rod 346 is normally urged to move upwardly by a spring 348 acting on the upper end of the opening and closing rod 346. As shown in FIG. 17, a pin 350 is fixed to the lower end of the opening and closing rod 346 and engages substantially T-shaped fingers 352a, 352b. The fingers 352a, 352b have respective upper portions angularly movably supported on a lower portion of the vertically movable main body 338 by pivot pins 354a, 354b, and also have respective grippers 356a, 356b on vertically extending lower ends thereof for gripping the long boss 20c of the spool 20.

A ring-shaped cam 360 is fixed to the opening and closing rod 346 at its intermediate position and disposed in an opening 359 defined in the vertically movable main body 338. The cam 360 engages a first cam rod 362 inserted horizontally in the vertically movable main body 338. The first cam rod 362 has opposite ends projecting out of respective opposite sides of the vertically movable main body 338. The first cam rod 362 includes a larger-diameter portion 364 near one of the opposite ends and a smaller-diameter portion 366 near the other end, with a tapered surface 368 interposed between the larger-diameter portion 364 and the smaller-diameter portion 366 (see FIG. 16). The fingers 352a, 352b are disposed between tubular bodies 369a, 369b of arcuate cross section which extend vertically downwardly from the vertically movable main body 338.

Figure 18:
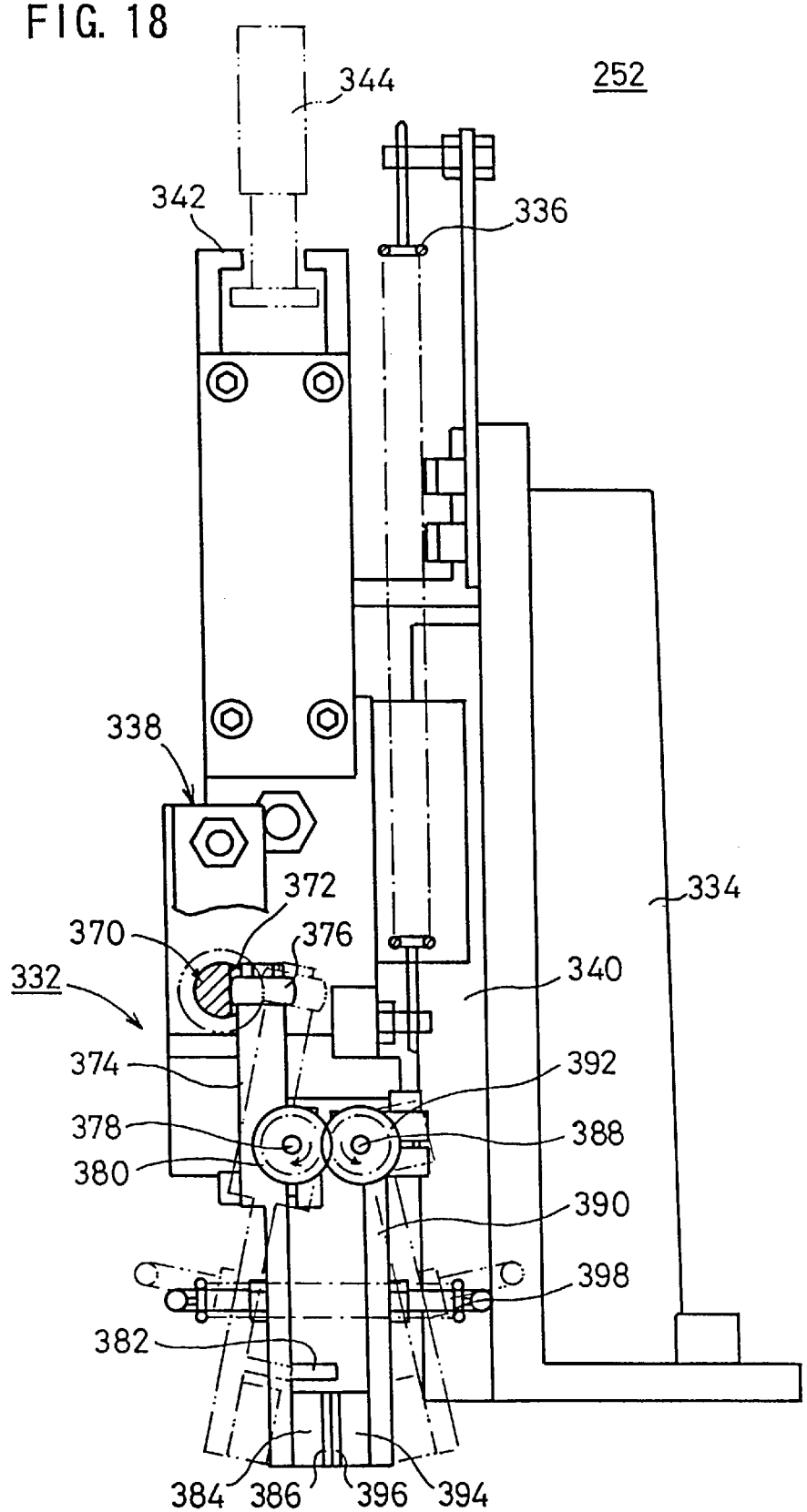
FIG. 18 is a side elevational view of the film coil inserting mechanism.

The tongue chuck 332 includes a second cam rod 370 slidably disposed in the vertically movable main body 338 parallel to the first cam rod 362. As shown in FIG. 15, the second cam rod 370 has a radially concave curved guide surface 372 defined in an outer circumferential surface thereof and engaged by a ring-shaped cam 376 mounted on the upper end of a first swing arm 374. As shown in FIG. 18, the first swing arm 374 has a substantially central portion swingably supported on the vertically movable main body 338 by a first support shaft 378 which supports a first gear 380 thereon. An engaging bar 382 projects inwardly from a lower portion of the first swing arm 374. A first gripping plate 386 of synthetic resin is fixed to the lower end of the first swing arm 374 by a first block 384.

A second swing arm 390 is swingably supported on the vertically movable main body 338 by a second support shaft 388 which supports a second gear 392 thereon that is held in mesh with the first gear 380. A second gripping plate 396 of synthetic resin is fixed to the lower end of the second swing arm 390 by a second block 394. The first and second swing arms 374, 390 are normally urged to move toward each other by a spring 398.

Figure 19:
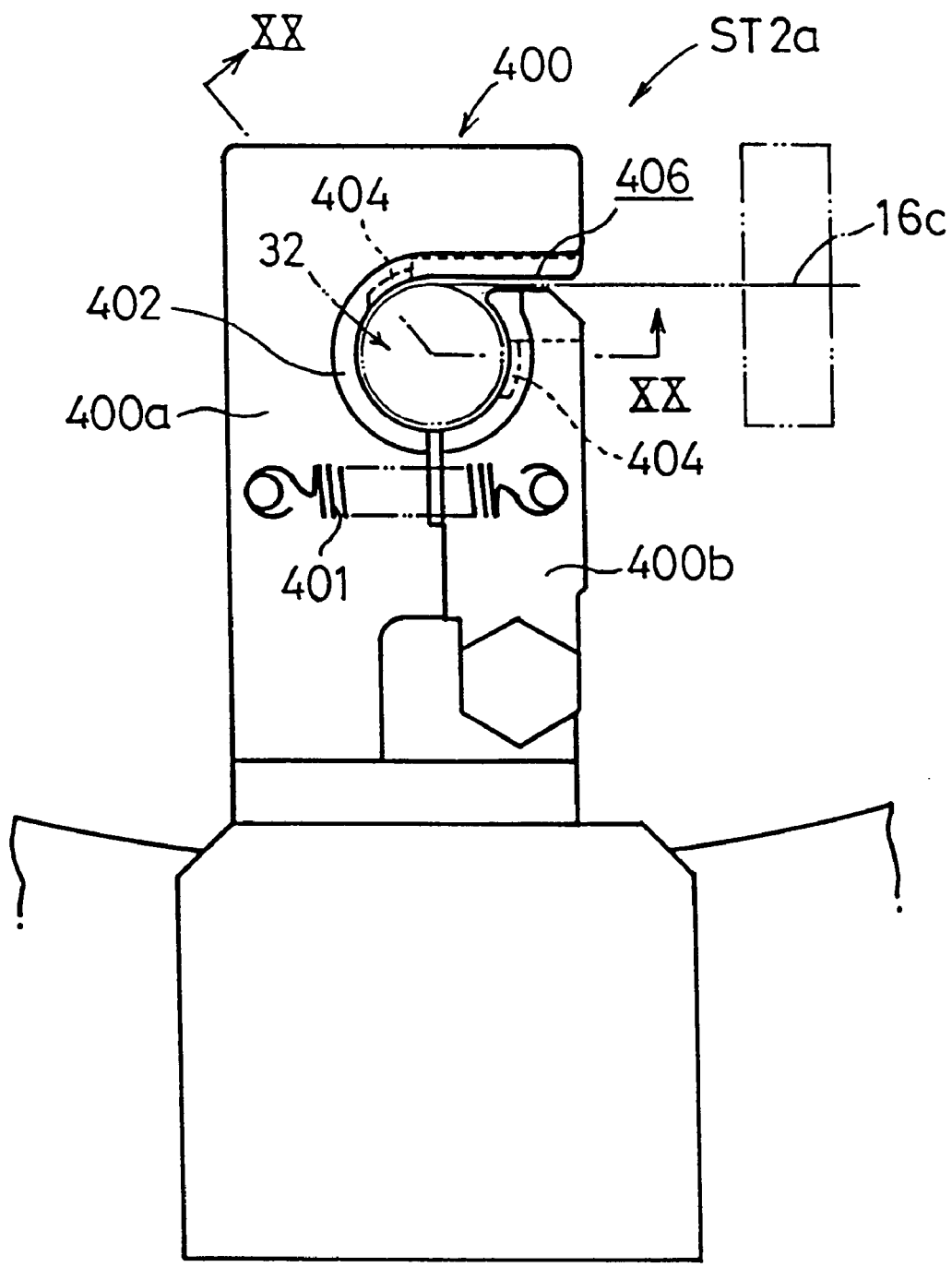
FIG. 19 is a plan view of an insertion guide.
Figure 20:
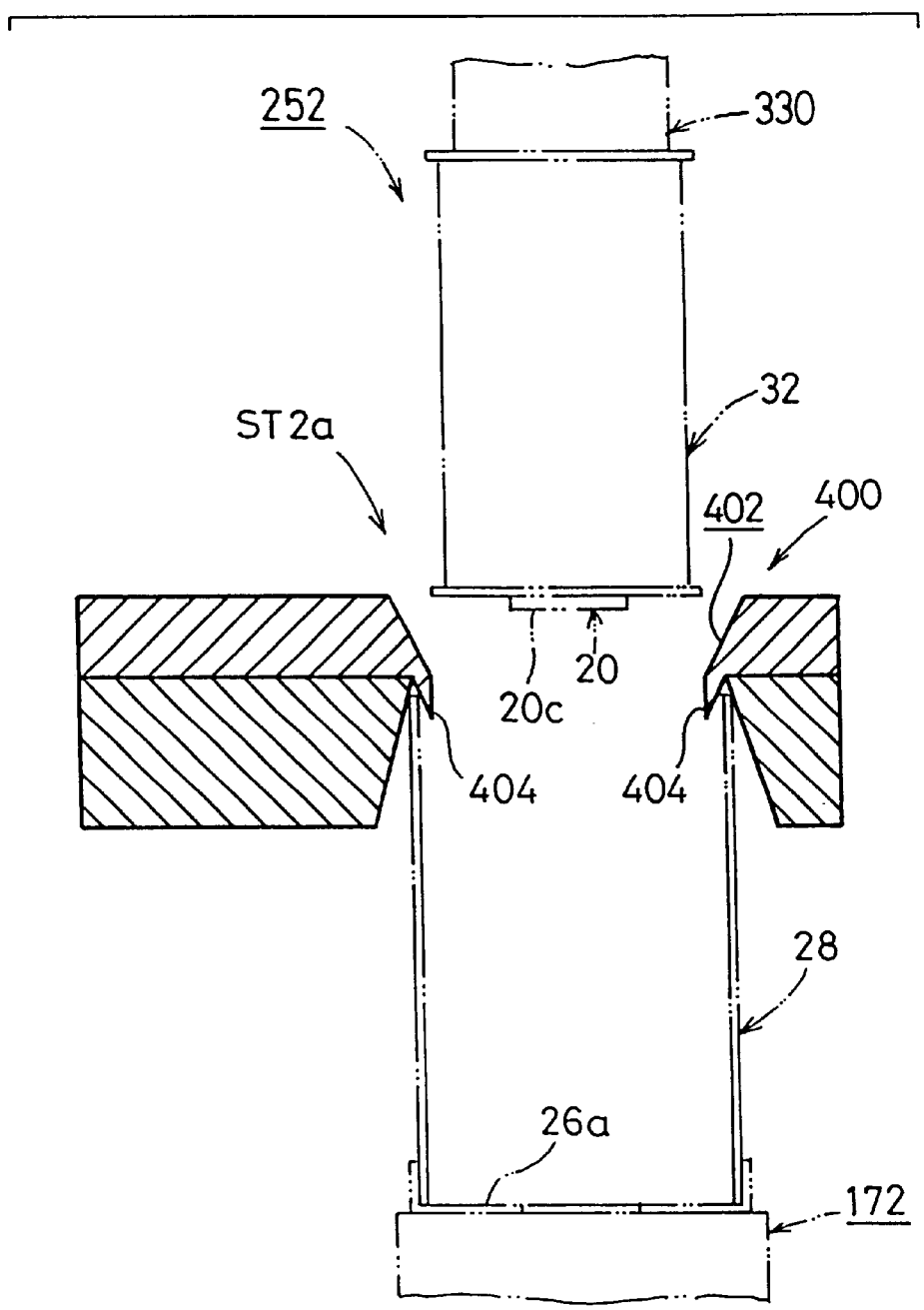
FIG. 20 is a view illustrative of the manner in which the film coil inserting mechanism and the cartridge positioning and holding mechanism operate.

As shown in FIGS. 19 and 20, the film-wound spool inserting station ST2a has an insertion guide 400 positioned between the film coil inserting mechanism 252 and the cartridge positioning and holding mechanism 172. The insertion guide 400 comprises a fixed guide 400a and a movable guide 400b swingable with respect to the fixed guide 400a under the bias of a spring 401 that acts therebetween. The fixed guide 400a and the movable guide 400b jointly have a tapered hole 402 whose diameter is progressively reduced downwardly, and a ridge 404 projecting downwardly from lower portions thereof for entering the open end of a single-open-ended cartridge 28 to keep the diameter of the open end at a predetermined dimension. The insertion guide 400 has a groove 406 communicating with the tapered hole 402 for passing the tongue 16c of a film 16 therethrough.

Figure 21:
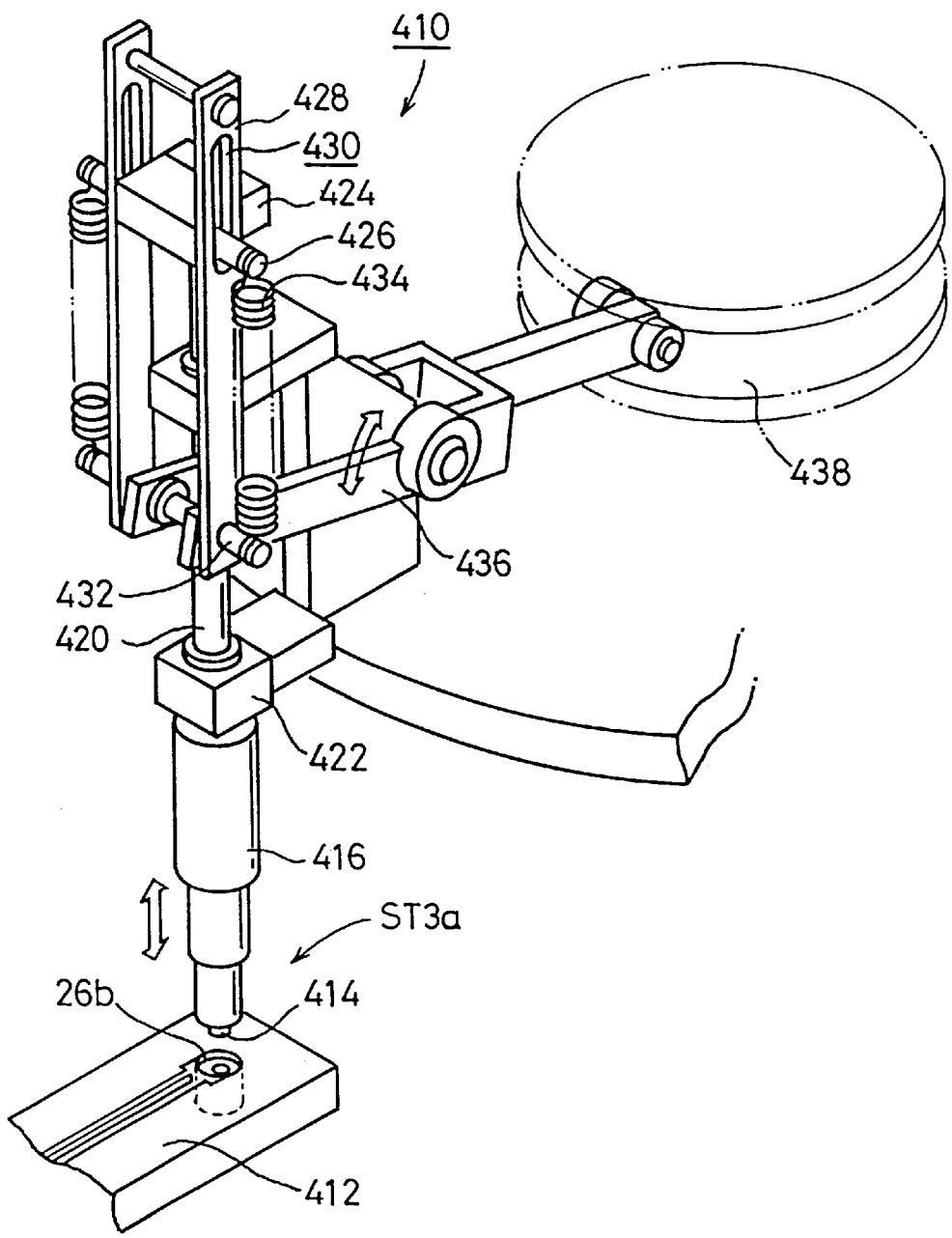
FIG. 21 is a perspective view of a cap inserting unit.
Figure 22:
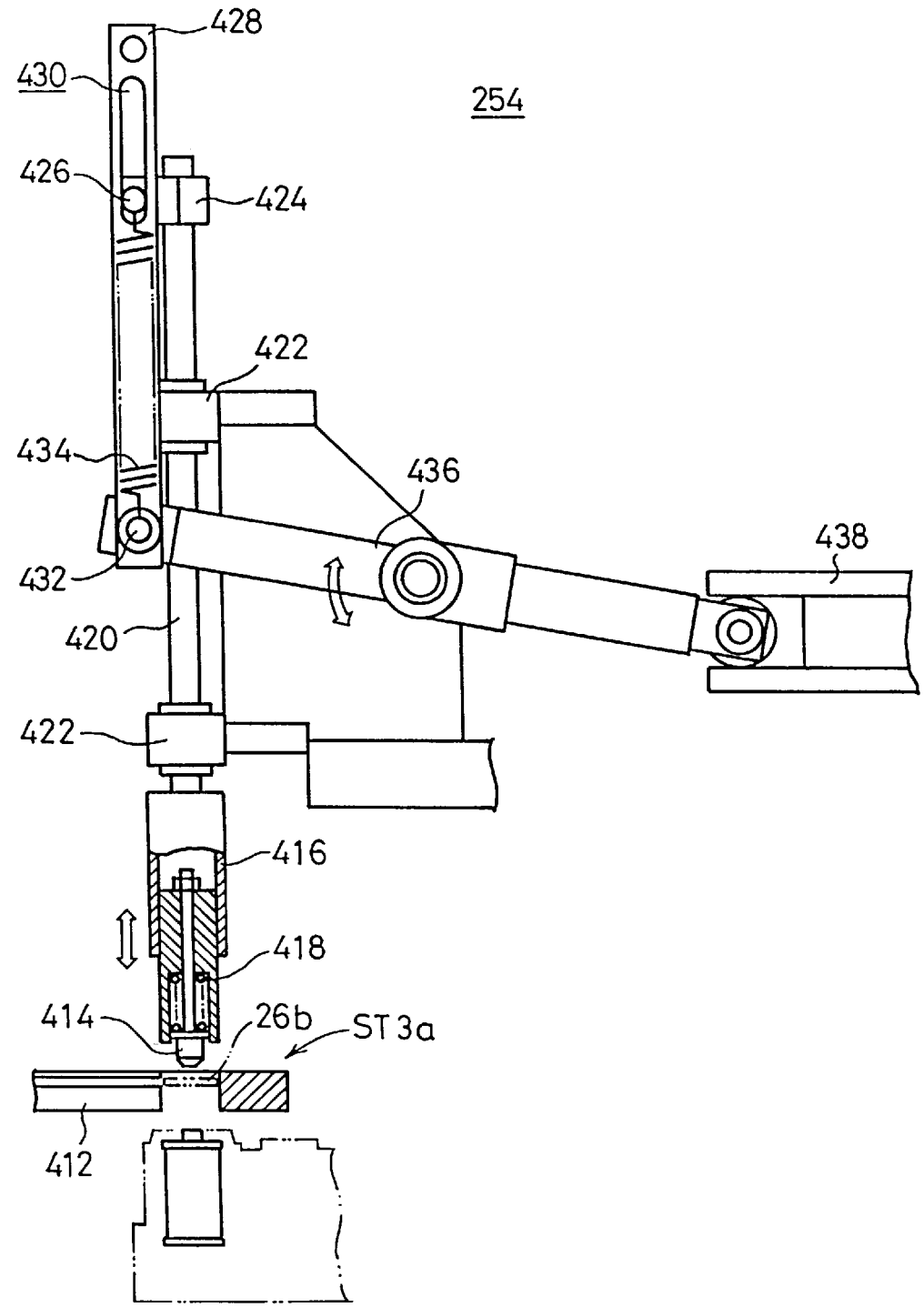
FIG. 22 is a side elevational view, partly in cross section, of the cap inserting unit.

As shown in FIGS. 21 and 22, the cap loading mechanism 254 has a cap inserting unit 410 for inserting a cap 26b, and a clinching unit (not shown) for clinching the cap 26b on the open end of a single-open-ended cartridge 28. The cap inserting unit 410 has a pusher 414 for inserting a cap 26b, delivered one by one by a conveyor 412, into the open end of a single-open-ended cartridge 28 that is held by the cartridge positioning and holding mechanism 172. The pusher 414 is movably supported in a support tube 416 under the bias of a spring 418.

The support tube 416 is fixed to the lower end of a rod 420 that is guided for vertical movement by a plurality of guides 422. An attachment member 424 is fixed to the upper end of the rod 420, and an engagement pin 426 projecting horizontally from opposite ends of the attachment member 424 is inserted in vertical oblongs 430 defined in respective bars 428. Springs 434 are connected between the engagement pin 426 and another engagement pin 432 mounted on the lower ends of the bars 428. The engagement pin 432 is engaged by an end of a swing cam 436 whose other end is engaged by a cam 438.

Figure 23:
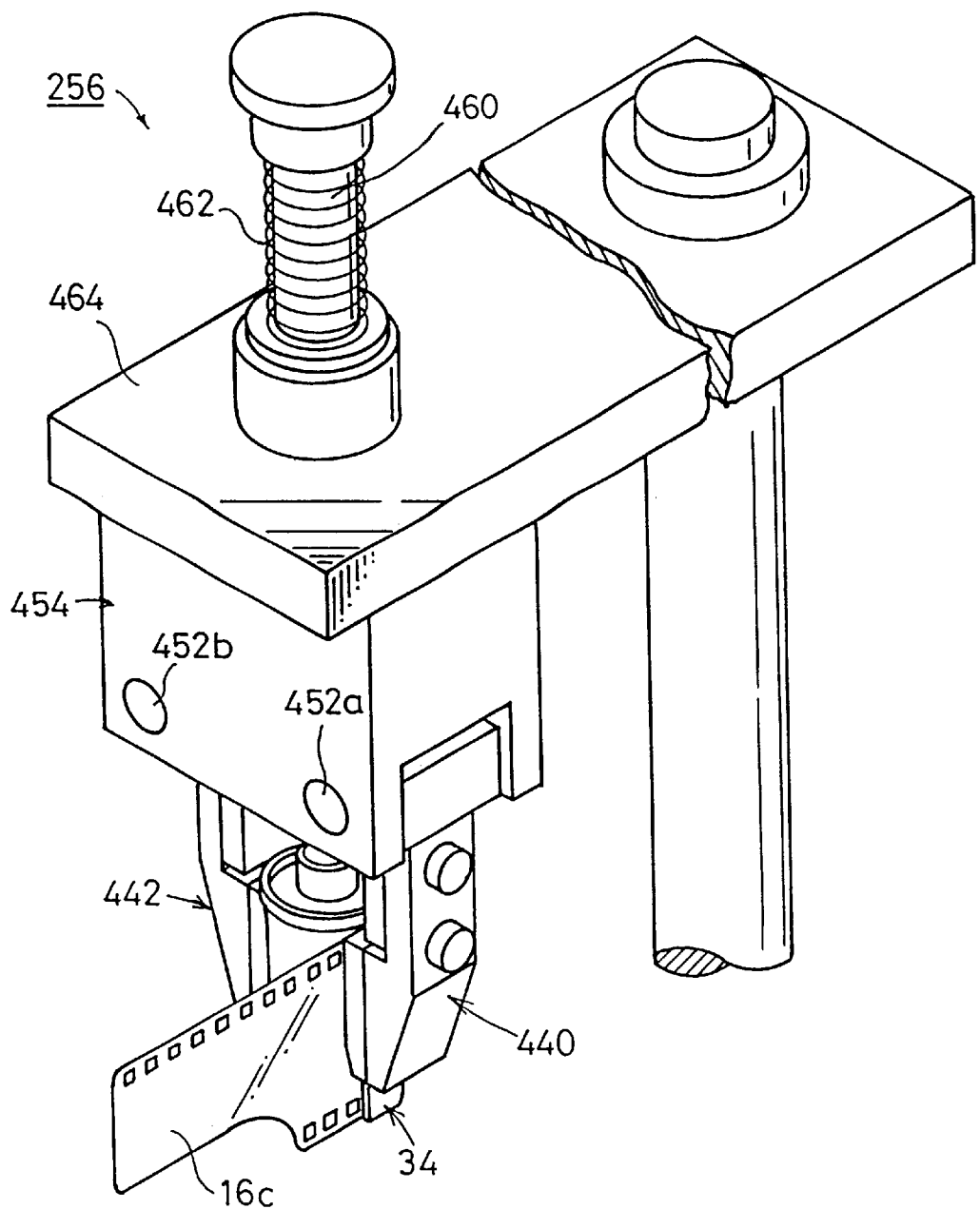
FIG. 23 is a perspective view of a film cartridge removing mechanism.
Figure 24:
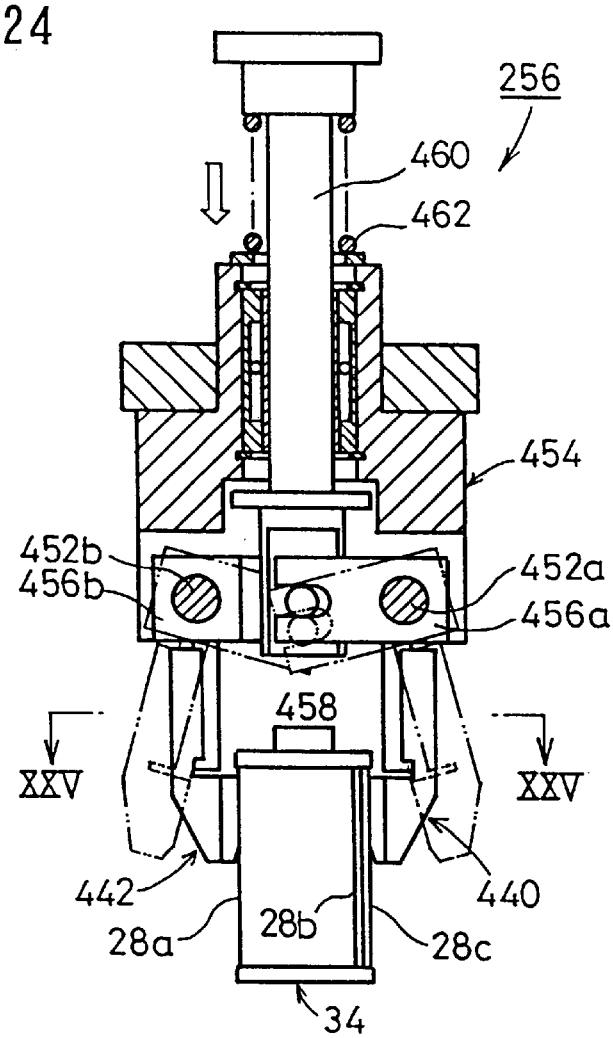
FIG. 24 is a front elevational view of the film cartridge removing mechanism.
Figure 25:
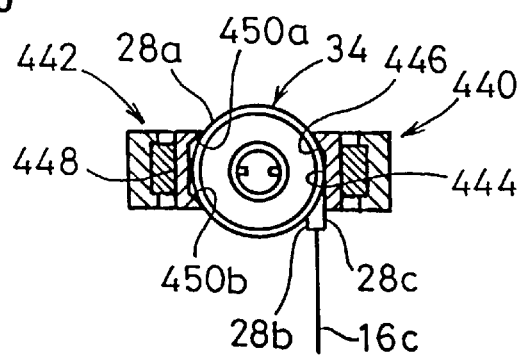
FIG. 25 is a cross-sectional view taken along line XXV—XXV of FIG. 24.

As shown in FIGS. 23 and 24, the film cartridge removing mechanism 256 has first and second fingers 440, 442 for gripping a straight edge 28c of a film cartridge 34 and an opposite circumferential surface 28a thereof, respectively. As shown in FIG. 25, the first finger 440 has a flat surface 444 for facing the straight edge 28c and a slanted surface 446 disposed on an end of the flat surface 444. The second finger 442 has a flat surface 448 and a pair of slanted surfaces 450a, 450b disposed on respective opposite ends of the flat surface 448.

The first and second fingers 440, 442 are swingably supported on a chuck body 454 by respective pins 452a, 452b, which are connected to respective swing arms 456a, 456b that are engaged by a drive pin 458. The drive pin 458 is mounted on the lower end of a vertically movable rod 460 which has a portion projecting upwardly from an upper portion of the chuck body 454. A spring 462 is disposed around the projecting portion of the vertically movable rod 460 for normally urging the vertically movable rod 460 upwardly. The chuck body 454 is supported by an arm 464 that is movable in certain directions.

Figure 26:
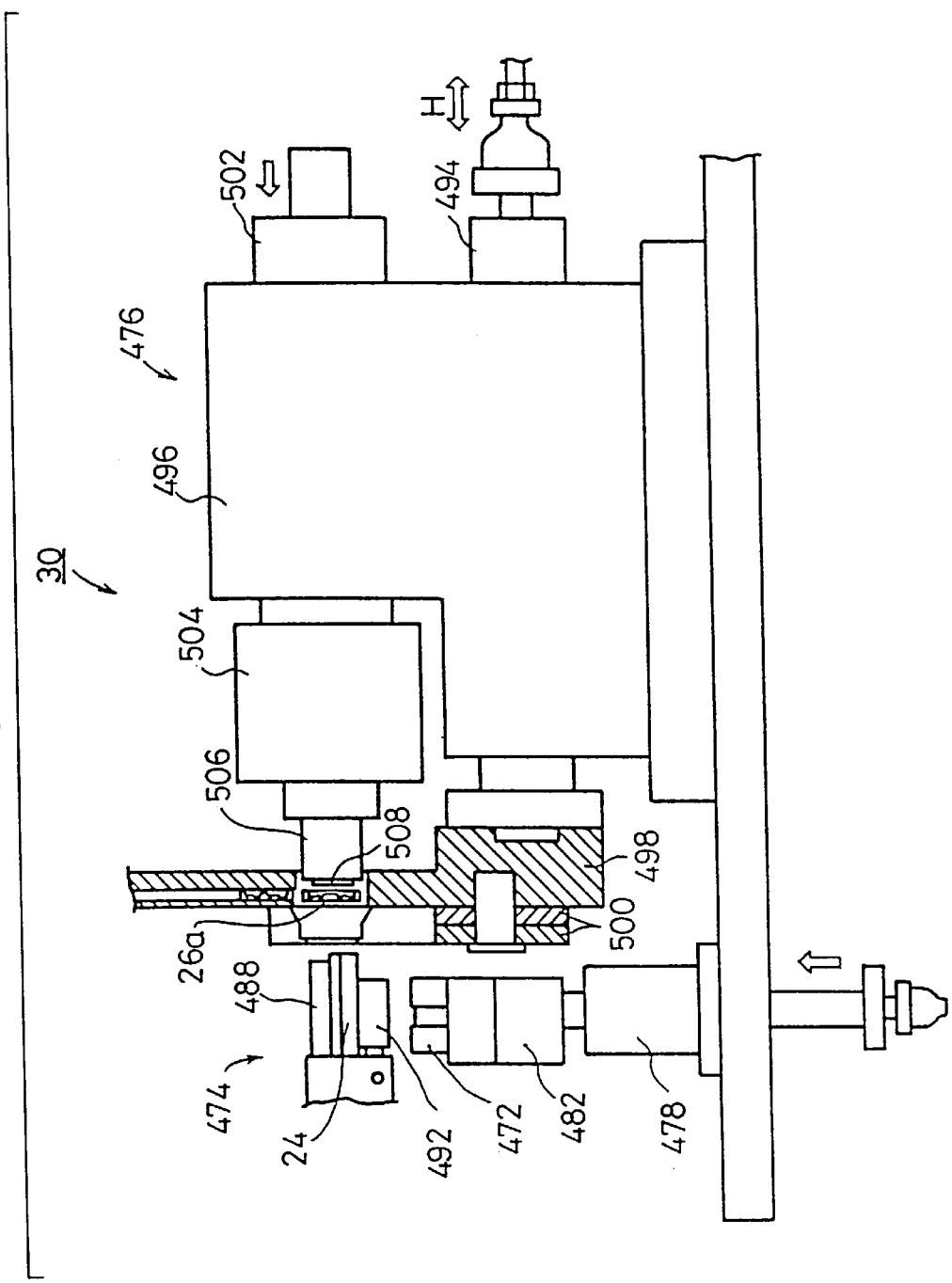
FIG. 26 is a side elevational view, partly cross section, of a cartridge producing unit.
Figure 27:
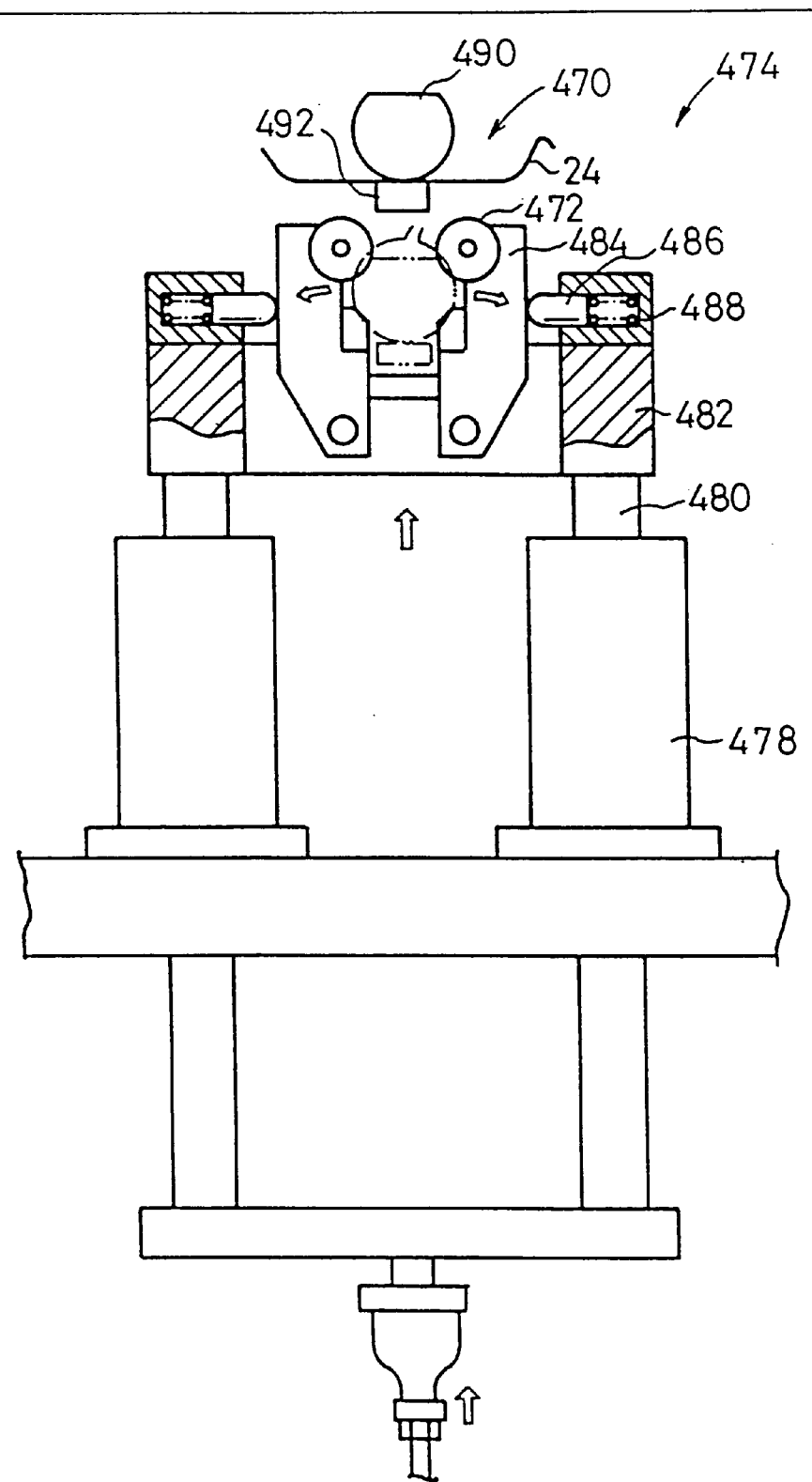
FIG. 27 is a front elevational view, partly in cross section, of the cartridge producing unit.

As shown in FIGS. 26 and 27, the cartridge producing unit 30 comprises a support pushing mechanism 470 for forming a lower portion of a cartridge blank sheet 24, a rounding roller mechanism 474 for rounding the cartridge blank sheet 24 with vertically movable two pairs of rounding rollers 472, and a clinching mechanism 476 for clinching a cap 26a on an end of the rounded cartridge blank sheet 24.

As shown in FIG. 27, the rounding roller mechanism 474 has a pair of shafts 480 vertically movable by cam mechanisms (not shown) vertically movably supported in a housing 478, and a roller holder 482 fixedly mounted on the shafts 480. A pair of arms 484 is swingably supported on the roller holder 482, and the rounding rollers 472 are rotatably mounted on ends of the arms 484. Pusher rods 486 are normally held against the arms 484 under the bias of springs 488. The support pushing mechanism 470 which is disposed above the arms 484 has a core member 490 for holding the cartridge blank sheet 24 and a support 492 for supporting the cartridge blank sheet 24.

The clinching mechanism 476 has a holder 496 which holds a shaft 494 that is movable in the directions indicated by the arrow H by a cam (not shown). A pair of openable and closable chucks 500 is mounted on an end of the shaft 494 by a chuck holder 498. The holder 496 supports a shaft 502 on which a clinching head 504 is mounted. A finger end 508 can be opened and closed by a shaft 506 that is reciprocally movably held in the shaft 502.

Figure 28:
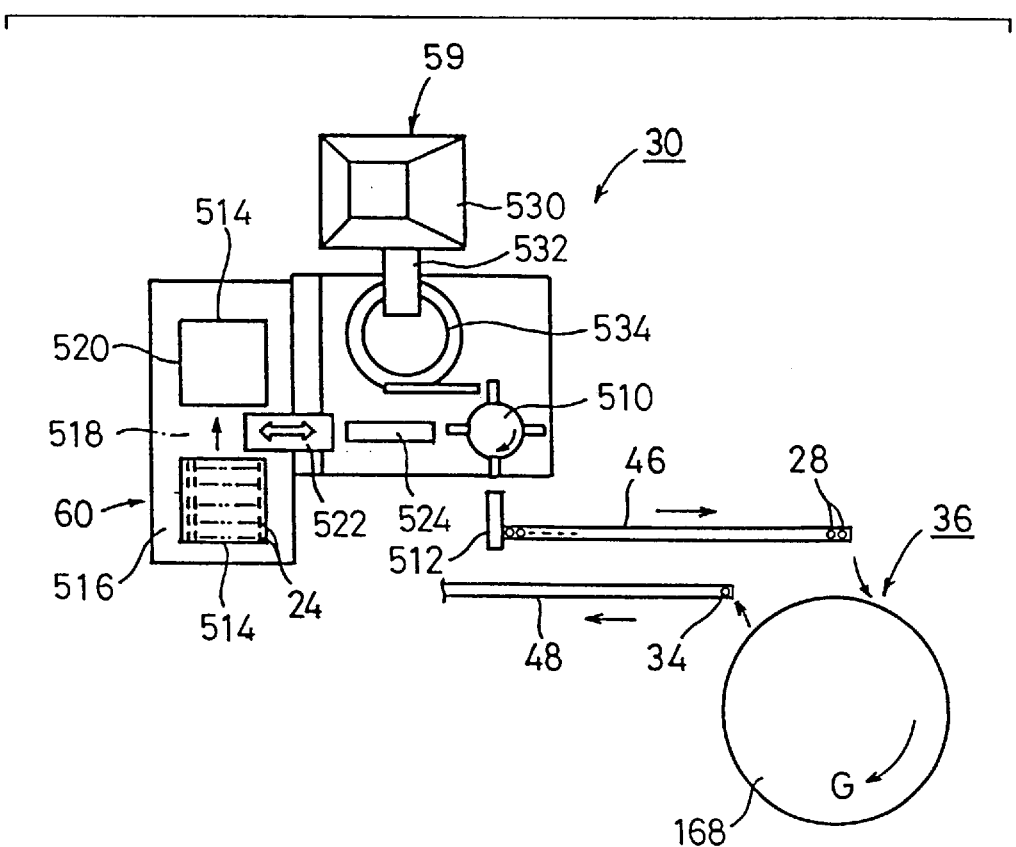
FIG. 28 is a schematic plan view of the cartridge producing unit.

As shown in FIG. 28, a rounding index disk 510 rounds cartridge blank sheets 24 into single-open-ended cartridges 28 successively. A single-open-ended cartridge 28 that has been produced by the rounding index disk 510 is held by an oblique feed path 512 and converted from a horizontal attitude to a vertical attitude, and thereafter fed to the first feed path 46.

The cartridge blank sheet supply unit 60 which is disposed near the cartridge producing unit 30 has a loading position 516 for loading a container 514 which contains cartridge blank sheets 24 in a plurality of rows, e.g., five rows, in a vertical attitude, a removing position for removing the cartridge blank sheets 24, one row at a time, from the container 514, and an unloading position 520 for discharging the container 514 from which all the cartridge blank sheets 24 have been removed. A cartridge blank sheet removing mechanism 522 is disposed near the removing position 518 for movement between the container 514 and an oblique conveyor 524 which delivers cartridge blank sheets 24 to the rounding index disk 510.

The cap supply unit 59 has a hopper 530 for storing a plurality of caps 26a. A vertically movable component lifter 532 for removing a certain number of caps 26a from the hopper 530 and holding the removed caps 26a is reciprocally movably positioned between the hopper 530 and a feeder 534 positioned upwardly of the hopper 530. The component lifter 532 removes a certain number of caps 26a from the hopper 530 in the lower end of its vertical stroke, then is lifted, and automatically supplies the caps 26a to the feeder 534.

Figure 29:
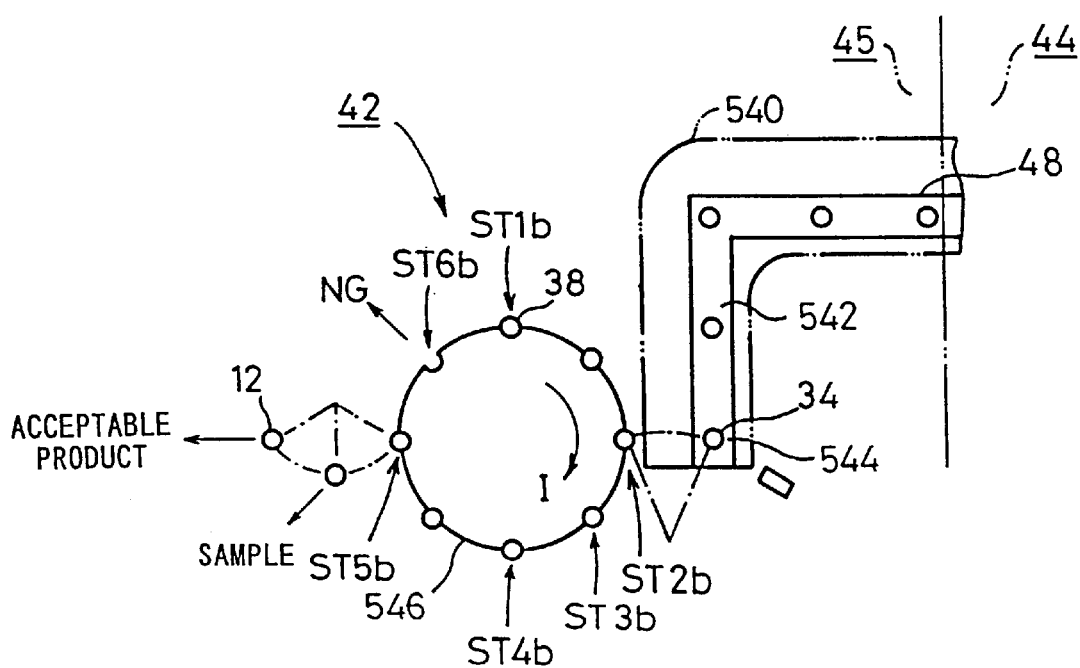
FIG. 29 is a schematic plan view of an encasing unit.

As shown in FIG. 29, the second straight feed path 48 extends from the dark chamber 44 to bright chamber 45, and then is bent about 90° and extends to the encasing unit 42. The bent portion of the second straight feed path 48 is covered with a light-shield cover 540. At a terminal end of the bent second straight feed path 48, there is disposed an inspection table 542 which has a torque detecting unit for detecting, with a torque checker, a vertical torque required to pull out the tongue 16c of the film 16 projecting from a film cartridge 34 to a predetermined length, and determining the film cartridge 34 defective if the detected torque is greater than a certain torque, a length detecting unit for detecting the length of the tongue 16c, a height detecting unit for detecting an increased height of a film cartridge 34 due to a clinching failure of the cap 26b, a cap detecting unit for detecting whether there is a cap 26b or not, and a cartridge bar-code checker. A defective film cartridge gate 544 for discharging a film cartridge that has been found defective by the above various unit is disposed downstream of the inspection table 542.

The encasing unit 42 comprises an index table 546 rotatable about its own axis clockwise in the direction indicated by the arrow I for indexing movement to eight angularly spaced positions. The index table 546 can successively be indexed to a case supply station ST1b for supplying a case 38, a cartridge inserting station ST2b for inserting a film cartridge 34 into the case 38, a cartridge detecting station ST3b for detecting whether there is a film cartridge 34 or not, a case cap inserting station ST4b for inserting a case cap 40 into the open end of the case 38, a normal packaged product discharging station ST5b for discharging a normal packaged product 12, and a defective packaged product discharging station ST6b for discharging a defective packaged product 12.

Figure 30:
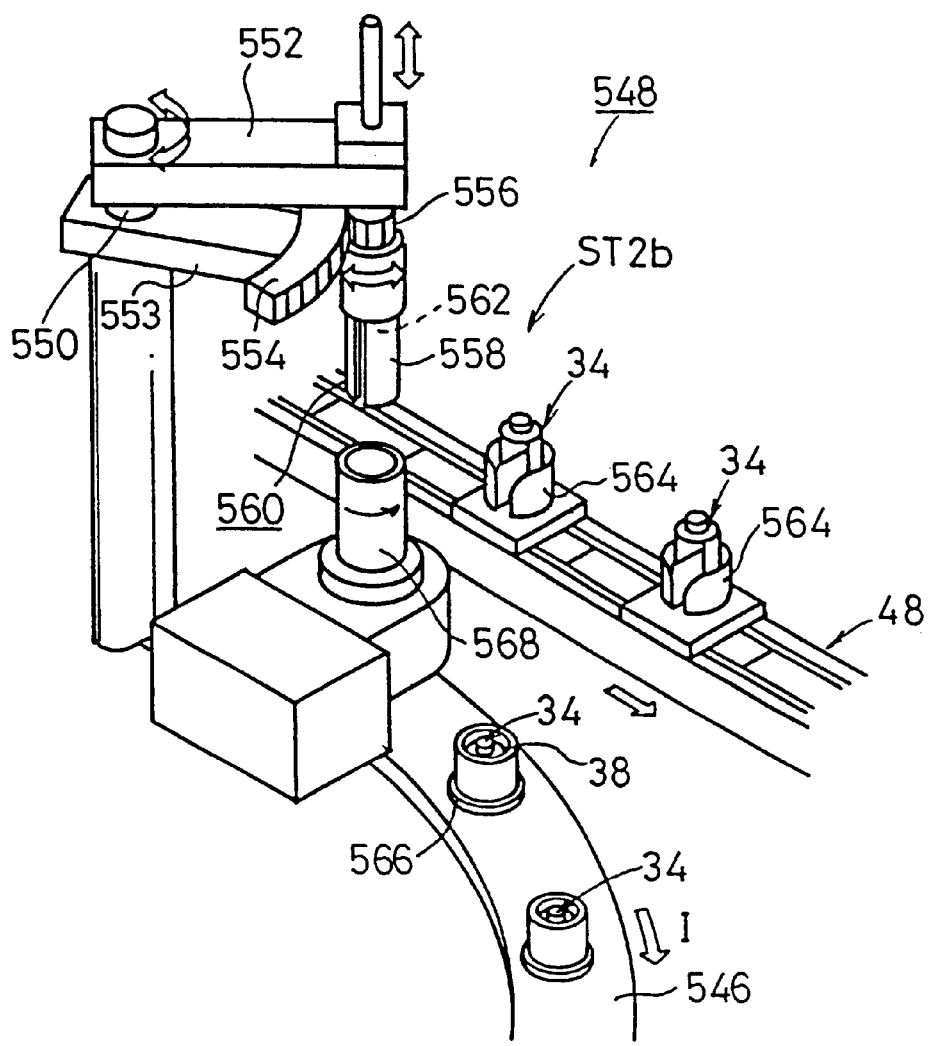
FIG. 30 is a fragmentary perspective view of the encasing unit.

As shown in FIG. 30, the cartridge inserting station ST2b is associated with a cartridge loading unit 548. The cartridge loading unit 548 has a rotatable shaft 550 rotatable about a vertical axis, a swing arm 552 having an end fixed to an upper end of the rotatable shaft 550, and a sector gear 554 disposed on an end of a fixed arm 553 and having a predetermined curvature. The sector gear 554 is held in mesh with a gear 556 mounted on an end of a tube 558 that is rotatably supported. The tube 558 has an opening 560 defined in the lower end thereof which has a certain width in the circumferential direction and extends axially. A suction cup 562 connected to a vacuum source (not shown) is vertically movably disposed in the tube 558.

The swing arm 552 can position the tube 558 selectively above a bucket 564 on the second straight feed path 48 and above a bucket 566 on the index table 546. A tubular member 568 is disposed above the bucket 566 for guiding a case 38 that is pushed upwardly from the bucket 566.

Figure 31:
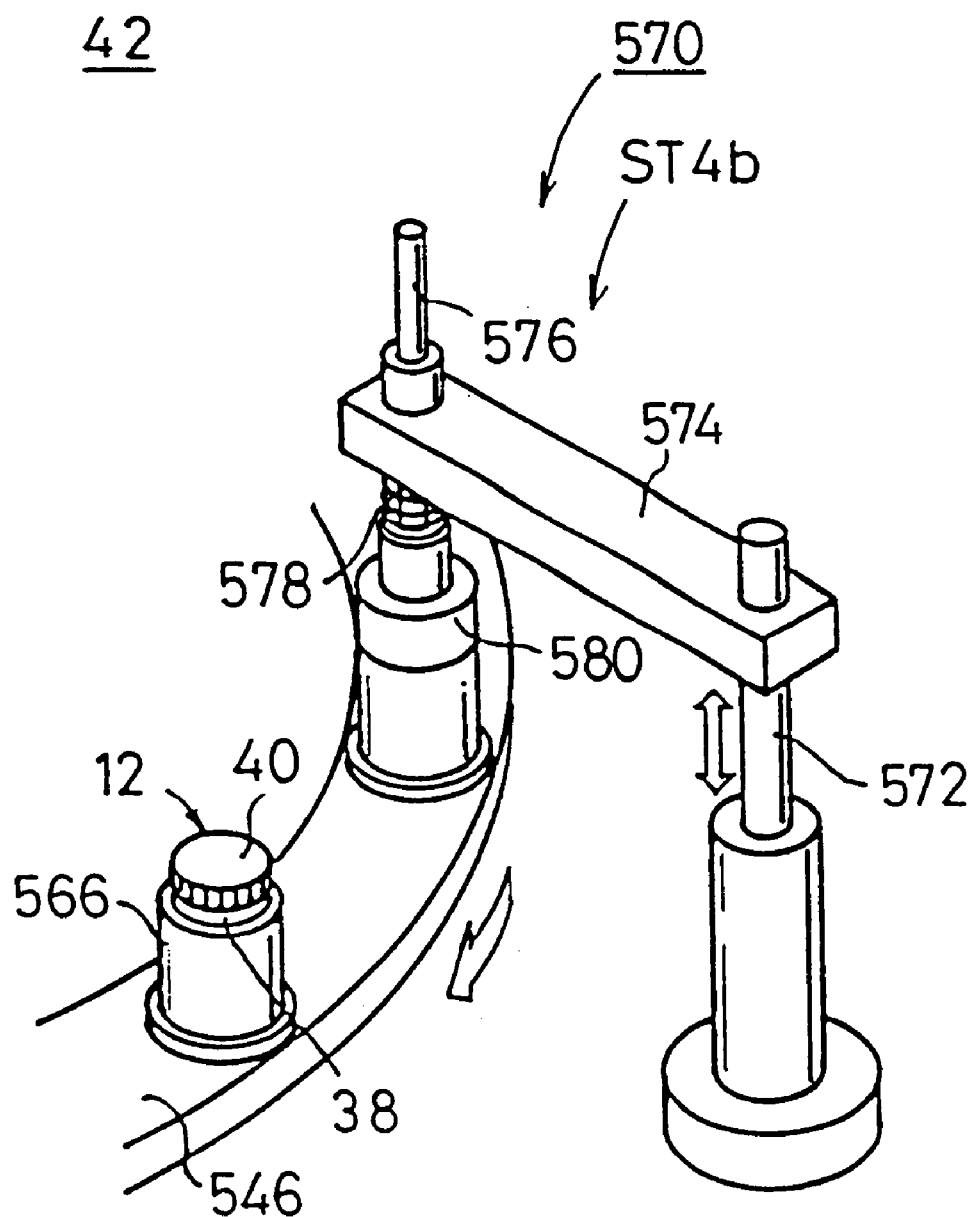
FIG. 31 is a fragmentary perspective view of the encasing unit.

As shown in FIG. 31, the case cap inserting station ST4b has a capper 570 which has a shaft 572 that is vertically movable by an actuating mechanism (not shown) and an arm 574 having an end fixed to the upper end of the shaft 572. A rod 576 is vertically movably supported on the other end of the arm 574 under the bias of a spring 578. A presser 580 is mounted on the lower end of the rod 576.

Operation of the manufacturing apparatus 10 thus constructed will be described below.

As shown in FIG. 4, the film roll 14 is unwound from the feeder 80, and the leading end of the unreeled elongate film F is delivered to the splicer 82. The elongate film F is then fed to the perforator 86 in which perforations 84 are formed in opposite sides of the elongate film F. The above process is repeated to form a succession of perforations 84 at a certain pitch in the opposite sides of the elongate film F.

The perforated elongate film F is then fed to the side printer 88 where latent images of belt-shaped prints depending on the film type are formed on one or both sides of the elongate film F by the first printing mechanism 92. The printed elongate film F forms a free loop between the path roller 90 and the sprocket wheel 94, after which the second printing mechanism 96 above the sprocket wheel 94 records a DX bar code, frame numbers, frame number bar codes, a commercial name, depending on the film size as latent images on one or both sides of elongate films F.

The elongate film F that has passed through the side printer 88 is fed to the cutter 89 where the elongate film F is cut to a predetermined length by the movable blade 98 and the fixed blade 100, producing a sized film 16. When the elongate film F is thus cut off, the tongue 16c of the sized film 16 which has been severed and the leading end of a sized film 16 to be produced next time are processed. At the same time that the leading end of the sized film 16 to be produced next time is processed, holes for engaging a spool are also formed in the leading end.

In the film coiling unit 22, as shown in FIG. 6, a spool 20 is supplied from the support arm 138 to the spool chuck 124 in the spool supply station ST1 on the turntable 122. In the spool chuck 124, the movable chuck 136 is displaced toward the fixed chuck 134 by a spring (not shown), and the movable chuck 136 and the fixed chuck 134 jointly grip the opposite ends of the spool 20.

Then, as shown in FIG. 5, the main shaft 120 is intermittently rotated clockwise in the direction indicated by the arrow E, moving the spook chuck 124 which holds the spool 20 to the spool positioning station ST2. In the spool positioning station ST2, the pawl 140 of the spool positioner 126 is pressed by the spool 20. When the spool 20 is rotated through a clutch (not shown), the pawl 140 engages the step of the spool 20, thus positioning the spool 20.

Further rotation of the turntable 122 in the direction indicated by the arrow E brings the spool 20 into the inserting station ST3. The sized film 16 is fed to the turntable 122 until its leading end 16a is inserted into the groove of the spool 20. The guide plate 112 is opened, allowing the tongue 16c of the sized film 16 to fall onto the film guide 148 (see FIG. 4).

In response to continued rotation of the turntable 122, the spool chuck 124 which holds the spool 20 reaches the prewinding station ST4. As shown in FIG. 5, the prewinding motor 142 of the prewinder 130 is operated to cause the belt and pulley mechanism 144 to move a touch roller (not shown) into contact with the spool chuck 124, for thereby rotating the spool 20. The sized film 16 whose leading end 16a engages the spool 20 is now prewound on the spool 20 to a predetermined length. As shown in FIG. 4, when the tongue 16c of the sized film 16 passes the first photosensor 150a, the touch roller is decelerated, and when the tongue 16c of the sized film 16 is detected by the second photosensor 150b, the spool 20 is stopped against rotation.

The turntable 122 is further rotated to move the spool chuck 124 which holds the spool 20 with the prewound film 16 to the winding station ST5. In the winding station ST5, as shown in FIG. 5, the winding motor 152 of the winder 132 is operated. The sized film 16 is wound on the spool 20, producing a film coil 32.

The film coil 32 is held by the holder 160 of the first transfer unit 154, and then angularly moved 90° from a horizontal attitude to a vertical attitude when the holder 160 turns 180°. The film coil 32 in the vertical attitude is gripped by the grips 166 of the second transfer unit 156. In the second transfer unit 156, the turntable 164 rotates in unison with the vertical rotatable shaft 162, bringing the film coil 32 gripped in the vertical attitude by the grips 166 to a standby position above the cartridge positioning and holding mechanism 172 that is placed in the inserting station ST3 on the index table 168 of the assembling unit 36. A single-one-ended cartridge 28 is placed in the cartridge positioning and holding mechanism 172.

In the cartridge producing unit 30, as shown in FIG. 27, after a cartridge blank sheet 24 is gripped by the core member 490 and the support 492, the shaft 480 is displaced vertically upwardly by the cam mechanisms (not shown). The roller holder 482 is elevated, bringing the rounding rollers 472 mounted on the distal ends of the arms 484 swingably supported on the roller holder 482 into contact with the cartridge blank sheet 24, which is rounded into a shape complementary to the core member 490, as shown by the two-dot-and-dash line in FIG. 27.

Then, as shown in FIG. 26, the shaft 494 of the clinching mechanism 476 is displaced toward the rounding roller mechanism 474. The chucks 500 movable with the chuck holder 498 toward the rounding roller mechanism 474 grip the cartridge blank sheet 24 rounded by the rounding roller mechanism 474. At the same time that the chuck holder 498 is moved, the clinching head 504 is moved by the shaft 502 in the direction indicated by the arrow, fitting a cap 26a into an end of the rounded cartridge blank sheet 24. The shaft 506 is moved by a cam (not shown), opening the finger end 508 of the clinching head 504 to stake or crimp the cap 26a, thus producing a single-open-ended cartridge 28.

As shown in FIG. 28, after a single-open-ended cartridge 28 has been delivered from the rounding index disk 510 into the oblique feed path 512, the single-open-ended cartridge 28 is fed through the first feed path 46 to the assembling unit 36. The single-open-ended cartridge 28 is transferred by the positioning and inserting mechanism 250 from the first straight feed path 46 to the cartridge positioning and holding mechanism 172 in the single-open-ended cartridge supply station ST1a.

Specifically, as shown in FIGS. 12 through 14, when single-open-ended cartridges 28 are successively fed down the first straight feed path 46, the cam 272 of the stopper 270 is actuated to place the engaging member 274 onto the conveyor 268. Therefore, the engaging member 274 holds a leading one of the single-open-ended cartridges 28, and places the single-open-ended cartridge 28 in a removal position on the conveyor 268. The first and second cams 280, 282 of the positioning and inserting mechanism 250 are actuated to displace the moving mechanism 266. The first delivering unit 260 descends from a position above the single-open-ended cartridge 28 disposed on the conveyor 268, and the magnets 290 of the first delivering unit 260 attracts the open end of the single-open-ended cartridge 28.

Then, the first delivering unit 260 is lifted by the moving mechanism 266 and removes the single-open-ended cartridge 28 from the first straight feed path 46. Thereafter, the first delivering unit 260 as it attracts and holds the single-open-ended cartridge 28 is moved to a position over the positioning station ST6a. When the first delivering unit 260 is lowered by the second cam 282, the single-open-ended cartridge 28 attracted and held by the first delivering unit 260 is lowered, and the tapered guide 304 of the positioning unit 262 is inserted into the cap 26a, thus centering the single-open-ended cartridge 28.

Upon further descent of the first delivering unit 260, the lower end of the holder 288 on which the magnets 290 are mounted abuts against and is supported by the stopper 292, and the pusher 286 is displaced downwardly with respect to the holder 288. The conical point 298 of the pusher 286 pushes downwardly the open end of the single-open-ended cartridge 28, which is released from the first delivering unit 260. The cap 26a side of the single-open-ended cartridge 28 is now attracted by the magnet 308 of the positioning unit 262. After the single-open-ended cartridge 28 is held by the positioning unit 262, the first delivering unit 260 moves upwardly, and then moves to a position above the first straight feed path 46.

In the positioning unit 262, the rack 324 is horizontally displaced to a predetermined position by the drive cam 322. The pinion 320 held in mesh with the rack 324 rotates in unison with the rotary ring 318 and the finger 310 with respect to the support post 316. The finger 310 engages the folded edge 28b of the single-open ended cartridge 28, and rotates the single-open ended cartridge 28. When the finger 310 is stopped in a predetermined position, the port 28d in the single-open ended cartridge 28 is placed in a predetermined angular position.

Since the cap 26a of the single-open ended cartridge 28 is attracted to the magnet 308, when the finger 310 rotates in engagement with the folded edge 28b and is stopped in the predetermined position, the inertia of rotation of the single-open ended cartridge 28 is held by the magnet 308. The port 28d in the single-open ended cartridge 28 is thus placed in an accurate angular position.

After the single-open ended cartridge 28 is positioned in its circumferential direction in the positioning station ST6a, the second delivering unit 264 disposed above the positioning station ST6a is lowered. The holder 288 of the second delivering unit 264 abuts against the stopper 292, and the magnets 290 on the holder 288 attract the single-open ended cartridge 28 on the positioning unit 262 because the attractive force of the magnets 290 is greater than the attractive force of the magnet 308.

When the single-open ended cartridge 28 is attracted by the second delivering means 264, the second delivering means 264 is lifted. Thereafter, the second delivering means 264 is positioned above the single-open-ended cartridge supply station ST1a by the first cam 280 of the moving mechanism 266. In the single-open-ended cartridge supply station ST1a, as shown in FIGS. 7 and 8, the movable chuck 174 of the cartridge positioning and holding mechanism 172 is open. The large-diameter flange 246 of the vertically movable rod 240 has been pushed upwardly by an actuator (not shown), such as a cam, a cylinder, or the like, placing the magnet 248 on the distal end of the vertically movable rod 240 in an elevated position.

When the second delivering unit 264 is lowered, as shown in FIG. 12, the holder 288 abuts against the stopper 292, and the pusher 286 projects downwardly from the holder 288. The cap 26a of the single-open-ended cartridge 28 which is attracted by the magnets 290 is attracted by the magnet 248, and the open end of the single-open-ended cartridge 28 is held by the conical point 298 of the pusher 286. Then, the pusher 286 and the vertically movable rod 240 are displaced downwardly in synchronism with each other.

The single-open-ended cartridge 28 held by the magnet 248 and the pusher 286 is introduced into the movable chuck 174, and the cap 26a is placed into the hole 234 by being guided by the tapered surface 232 of the fixed guide 176. The single-open-ended cartridge 28 is now centered and positioned circumferentially, and held in position by the fixed guide 176. Then, the pusher 286 is lifted, and the index table 168 is turned a predetermined angle in the direction indicated by the arrow G for thereby placing the cartridge positioning and holding mechanism 172 to which the single-open-ended cartridge 28 has been transferred in the single-open-ended cartridge supply station ST1a, in the film-wound spool inserting station ST2a.

The positioning and inserting mechanism 250 has the first and second delivering units 260, 264 that operate in synchronism with each other. The first delivering unit 260 delivers the single-open-ended cartridge 28 on the first straight feed path 46 to the positioning station ST6a, and the second delivering unit 264 delivers the single-open-ended cartridge 28 positioned in the positioning station ST6a to the cartridge positioning and holding mechanism 172.

In the positioning station ST6a, the finger 310 of the positioning unit 262 rotates the single-open-ended cartridge 28 to position same in the circumferential direction. Thereafter, the single-open-ended cartridge 28 is transferred to the cartridge positioning and holding mechanism 172. The port 28d in the single-open-ended cartridge 28 is thus positioned highly accurately, and the single-open-ended cartridge 28 is axially centrally, thereby avoiding a loading error which would otherwise be caused by a positioning failure of the single-open-ended cartridge 28.

The first and second delivering units 260, 264 have the magnets 290 for attracting the single-open-ended cartridge 28, and the pusher 286 for pushing the single-open-ended cartridge 28 attracted by the magnets 290. Therefore, the overall structure of the positioning and inserting mechanism 250 is effectively simplified.

In the cartridge positioning and holding mechanism 172, the single-open-ended cartridge 28 is inserted in its axial direction by the second delivering unit 264 with the cap 26a positioned ahead. Therefore, the angular range in which the folded-edge chuck 208 and the straight-edge chuck 210 are opened and closed is much smaller than with a structure for circumferentially inserting the single-open-ended cartridge 28, and hence the tubular angularly movable member 204 is angularly movable in a greatly reduced angular range. Accordingly, the movable chuck 174 is effectively simplified in structure and reduced in size.

The cartridge positioning and holding mechanism 172 has the fixed guide 176 for smoothly guiding the cap 26a of the single-open-ended cartridge 28 that is inserted in its axial direction and axially centering the single-open-ended cartridge 28. Therefore, the fixed guide 176 and the movable chuck 174 are jointly capable of positioning the single-open-ended cartridge 28 highly accurately.

In the film-wound spool inserting station ST2a, the film coil inserting mechanism 252 holds the film coil 32 through the second transfer unit 156. Specifically, as shown in FIGS. 15 through 18, the grippers 356a, 356b of the spool chuck 330 grip the long boss 20c of the spool 20 of the film coil 32, and the first and second gripping plates 386, 396 of the tongue chuck 332 grip the tongue 16c of the sized film 16.

Figure 32:
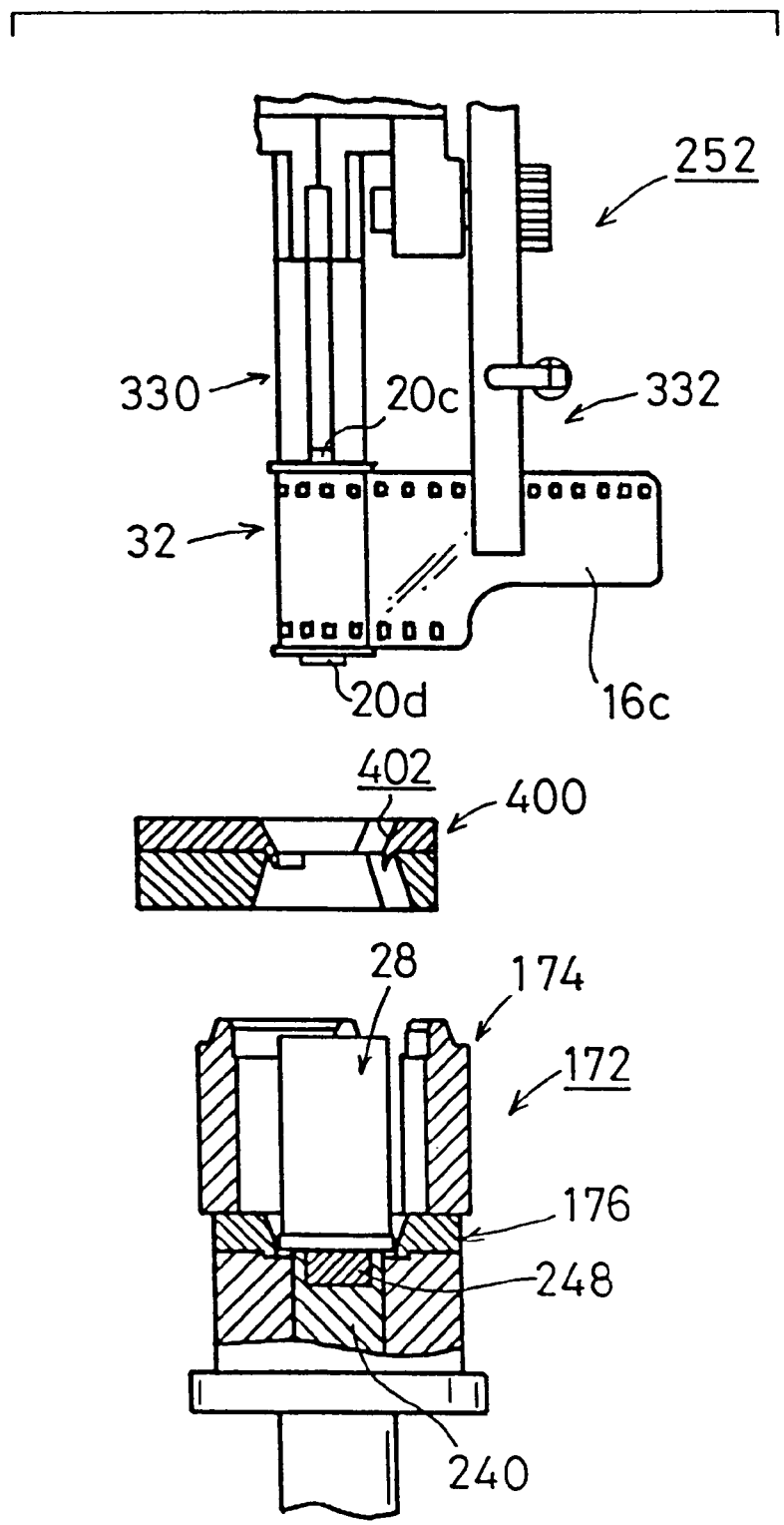
FIG. 32 is a cross-sectional view showing the manner in which a film coil is placed over a cartridge with one open end.

As shown in FIG. 32, the vertically movable rod 240 of the cartridge positioning and holding mechanism 172 is elevated, lifting the single-open-ended cartridge 28 attracted by the magnet 248 while being guided by the insertion guide 400. As shown in FIG. 33, the insertion guide 400 has the downwardly projecting ridge 404 which keeps the open end of the single-open-ended cartridge 28 in its predetermined shape.

Figure 34:
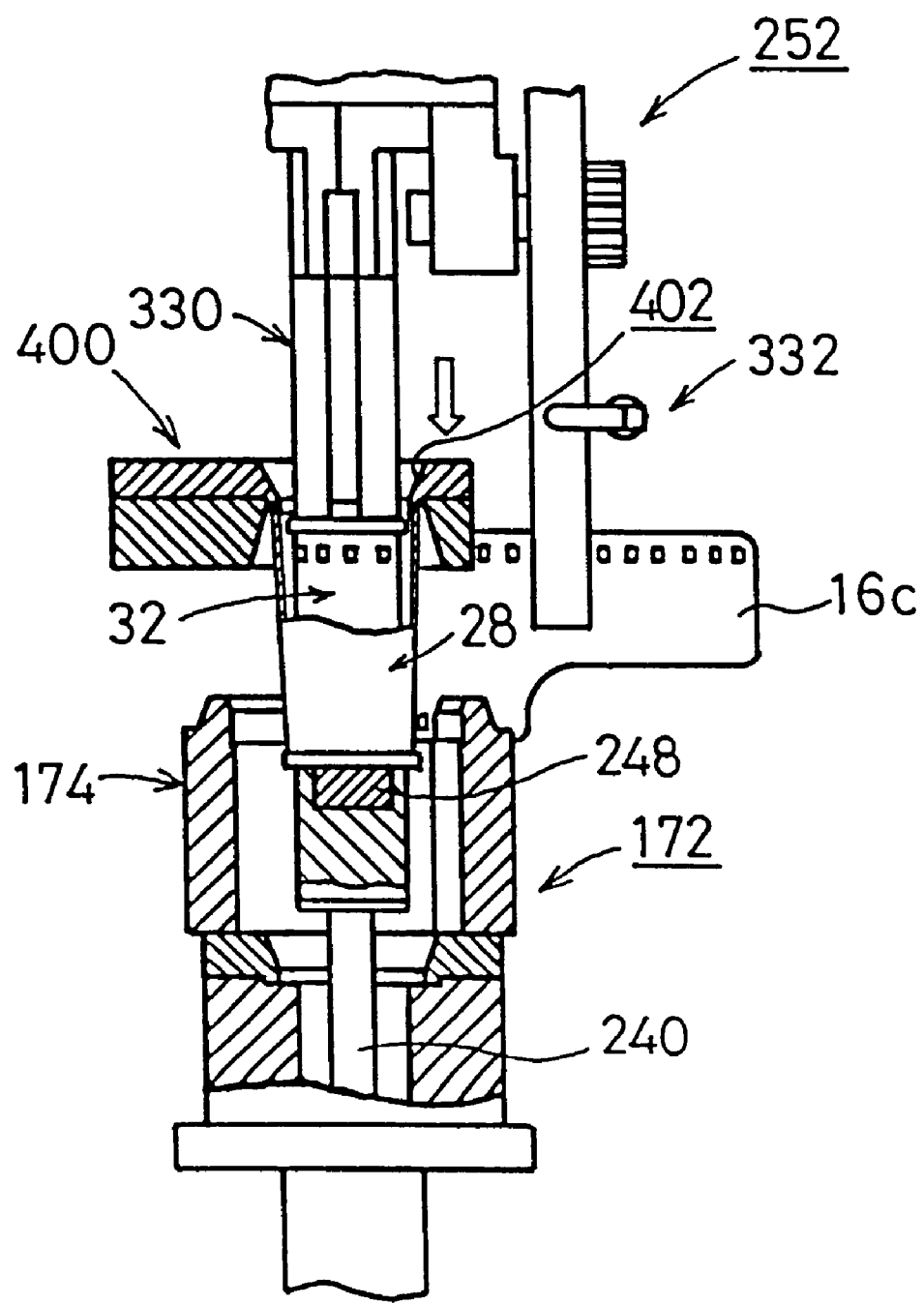
FIG. 34 is a cross-sectional view showing the manner in which the film coil is inserted into the cartridge with one open end.
Figure 36:
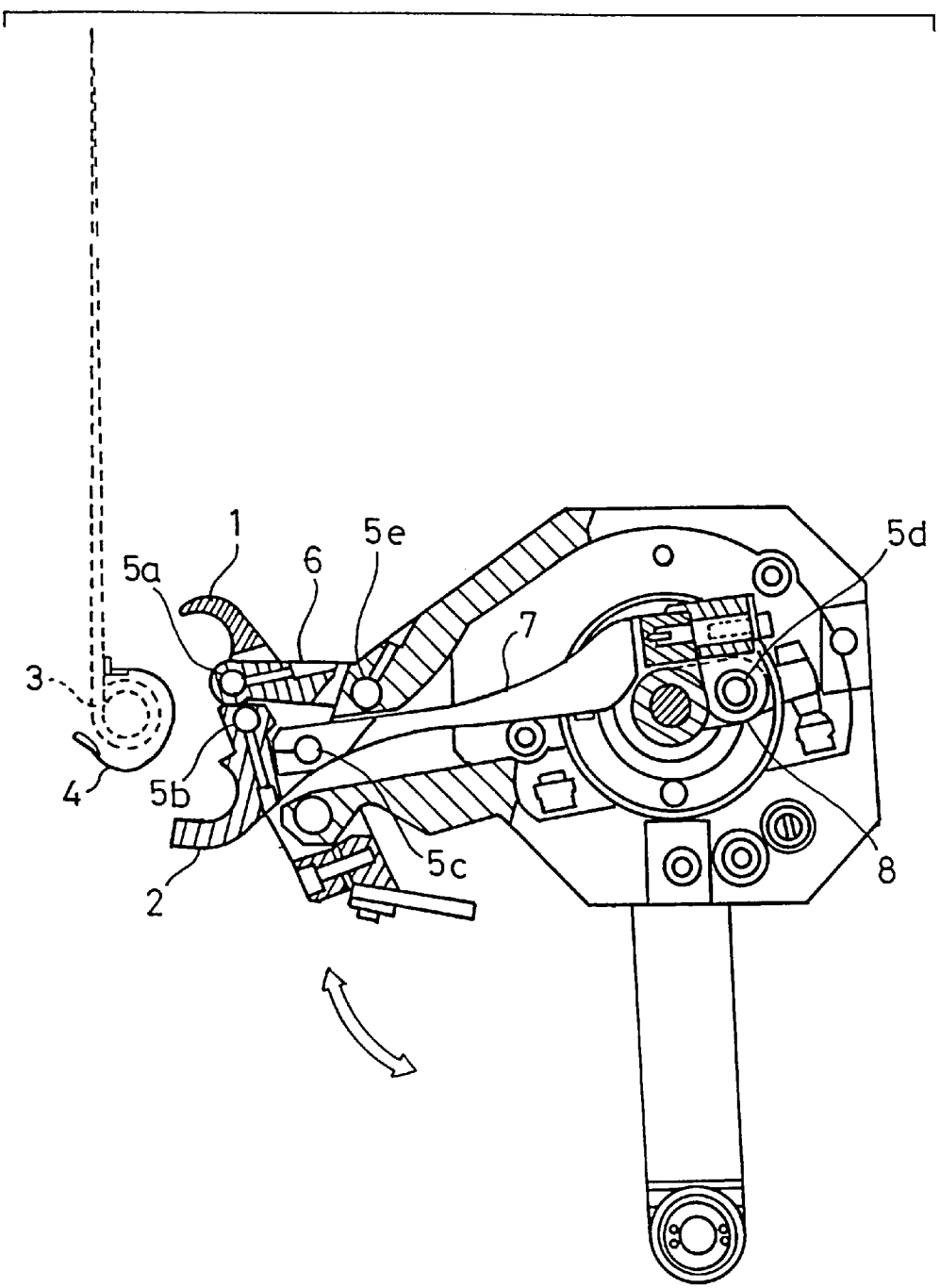
FIG. 36 is a cross-sectional view of a conventional chuck structure.

The vertically movable main body 338 of the film coil inserting mechanism 252 is displaced vertically downwardly with respect to the fixed frame 334 by the vertically movable cam 344 and the engaging member 342. Therefore, as shown in FIG. 34, the spool 20 of the film coil 32 is smoothly guided into the single-open-ended cartridge 28 by the tapered hole 402 in the insertion guide 400, and the tongue 16c is inserted into the port 28d in the single-open-ended cartridge 28 by passing through the groove 406 in the insertion guide 400 (see FIG. 19). After the film coil 32 is fully inserted in the single-open-ended cartridge 28 until a short boss 20d of the spool 20 abuts against the cap 26a of the single-open-ended cartridge 28, the first and second cam rods 362, 370 of the spool chuck 330 and the tongue chuck 332 are driven in the direction indicated by the arrow in FIG. 16.

When the first cam rod 362 is driven in the direction indicated by the arrow, the cam 360 of the spool chuck 330 moves from the smaller-diameter portion 366 via the tapered surface 368 onto the larger-diameter portion 364, as shown in FIGS. 16 and 17. Therefore, the opening and closing rod 346 to which the cam 360 is fixed is displaced downwardly against the bias of the spring 348, causing the pin 350 on the lower end of the opening and closing rod 346 to move downwardly. The fingers 352a, 352b engaging the pin 350 are then turned to angularly move the grippers 356a, 356b away from each other thereby to release the long boss 20c of the spool 20.

When the second cam rod 370 is driven in the direction indicated by the arrow, the cam 376 held in contact with the deeper area of the guide surface 372 of the second cam rod 370 is displaced radially outwardly along the guide surface 372, as shown in FIGS. 15 and 18. Therefore, the first swing arm 374 with the cam 376 on its end is angularly moved about the first support shaft 378 from the solid-line position to the two-dot-and-dash-line position in FIG. 18. When the first swing arm 374 is thus angularly moved, the first gear 380 on the first support shaft 378 is rotated in the direction indicated by the arrow, and the second gear 392 meshing with the first gear 380 is rotated in the direction indicated by the arrow. The second support shaft 388 on which the second gear 392 is mounted now turns the swing arm 390 from the solid-line position to the two-dot-and-dash-line position in FIG. 18. The first and second gripping plates 386, 396 are angularly moved away from each other, releasing the tongue 16c, and the vertically movable main body 338 of the film coil inserting mechanism 252 is lifted.

In the film coil inserting mechanism 252, as described above, the spool chuck 330 grips the long boss 20c of the spool 20 of the film coil 32, and the tongue chuck 332 grips the tongue 16c of the film coil 32. Therefore, the sized film 16 wound on the spool 20 is prevented from being loosened, and the spool 20 and the tongue 16c are held in an accurate constant relative positional relationship to each other, allowing the film coil 32 to be inserted reliably into the single-open-ended cartridge 28.

The open end of the single-open-ended cartridge 28 is supported by the ridge 404 of the insertion guide 400, and the spool 20 of the film coil 32 is guided by the tapered hole 402 in the insertion guide 400. Consequently, the film coil 32 can smoothly and efficiently inserted into the single-open-ended cartridge 28.

When the film coil 32 is to be gripped by the spool chuck 330 and the tongue chuck 332, the first and second cam rods 362, 370 are displaced in a direction opposite to the direction indicated by the arrow in FIG. 16. Therefore, the cam 360 is shifted from the larger-diameter portion 364 via the tapered surface 368 to the smaller-diameter portion 366, and the cam 360 and the opening and closing rod 346 are lifted together under the bias of the spring 348. The pin 350 on the lower end of the opening and closing rod 346 is lifted to cause the gripping plates 356a, 356b of the fingers 352a, 352b to be angularly displace toward each other, thus gripping the long boss 20c of the spool 20 that is inserted in the tubular bodies 369a, 369b.

The cam 376 held against the guide surface 372 of the second cam rod 370 is displaced from an outer area to a central area of the guide surface 372, allowing the first and second swing arms 374, 390 to swing toward each other under the bias of the spring 398. The first and second gripping plates 386, 389 are displaced toward each other, griping the tongue 16c.

After the film coil 32 is inserted into the single-open-ended cartridge 28 in the film-wound spool inserting station ST2a, the vertically movable rod 240 is lowered to insert the single-open-ended cartridge 28 attracted by the magnet 248 into the movable chuck 174, and the cap 26a is centered and held by the fixed guide 176 (see FIG. 35). The index table 168 is turned to deliver a predetermined angle to deliver the single-open-ended cartridge 28 with the film coil 32 inserted therein to the cap supply station ST3a, and the cam roller 186 of the movable chuck 174 is driven by a cam (not shown).

As shown in FIGS. 7 and 8, the cam roller 186 is coupled to the angularly movable shaft 182 by the arm 184, and the first arm 196 is angularly moved in unison with the angularly movable shaft 182. The second arm 200 which is connected to the first arm 196 by the bolt 198 is angularly moved by the first arm 196 and the spring 202. When the angularly movable member 204 to which the second arm 200 is fixed is angularly moved, the folded-edge arm 214 and the straight-edge arm 218 which are connected at ends thereof to the third support shaft 220 are angularly moved to close the folded-edge chuck 208 and the straight-edge chuck 210.

Therefore, as shown in FIG. 10, the forming members 226, 228 that are fixed to the respective ends of the folded-edge chuck 208 and the straight-edge chuck 210 engage the folded edge 28b and the straight edge 28d of the single-open-ended cartridge 28 for thereby forming the single-open-ended cartridge 28. Since the attachment holes 226a, 228a of the forming members 226, 228 for attaching them to the folded-edge chuck 208 and the straight-edge chuck 210 are oblong, the chucked attitude of the single-open-ended cartridge 28 and the port width thereof can be finely adjusted when the single-open-ended cartridge 28 is to be chucked.

The pressure applied by the folded-edge chuck 208 and the straight-edge chuck 210 to form the single-open-ended cartridge 28 is controlled by the resiliency of the spring 202 that is interposed between the first and second arms 196, 200. The resiliency of the spring 202 is set to a value capable of forming the open side of the single-open-ended cartridge 28 to a cylindrical shape against springing back, so that the folded-edge chuck 208 and the straight-edge chuck 210 can form the single-open-ended cartridge 28 under a constant pressure at all times, and are prevented from being structurally damaged if the film coil 32 is inserted in error or foreign matter is jammed.

In the cap supply station ST3a, as shown in FIGS. 21 and 22, the cap inserting unit 410 places a cap 26b, delivered one at a time by the conveyor 412, in a cap inserting position. When the swing cam 436 is angularly moved downwardly by the cam 438, the bars 428 connected to the distal end of the swing cam 436 by the engagement pin 432 are lowered, lowering the rod 420 in unison with the attachment member 424 that is coupled to the engagement pin 432 by the springs 434.

The rod 420 is guided by the guide 422 to move vertically downwardly, and the pusher 414 movably disposed in the support tube 416 on the lower end of the rod 420 under the bias of the spring 418 pushes the cap 26b on the conveyor 412 downwardly. The cap 26b is inserted into the upper open end of the single-open-ended cartridge 28 held by the cartridge positioning and holding mechanism 172 and housing the film coil 32 therein. After the cap 26b is inserted into the upper open end of the single-open-ended cartridge 28, the index table 168 is turned to move the single-open-ended cartridge 28 to the cap clinching station ST4a.

In the cap clinching station ST4a, the cap 26b is clinched on the upper open end of the single-open-ended cartridge 28 by a clinching mechanism (not shown), thus producing a film cartridge 34. The film cartridge 34 is then delivered by the index table 168 to the film cartridge discharging station ST5a which is associated with the film cartridge removing mechanism 256.

The movable chuck 174 of the cartridge positioning and holding mechanism 172 is open, and the vertically movable rod 240 has been lifted to place the film cartridge 34 attracted by the magnet 248 in an upper position. As shown in FIGS. 23 and 24, when the vertically movable rod 460 is pressed downwardly against the bias of the spring 462, the drive pin 458 on the vertically movable rod 460 angularly moves the swing arms 456a, 456b away from each other. After the chuck body 454 is placed at a predetermined height, the vertically movable rod 460 is released from the push, whereupon the swing arms 456a, 456b are angularly moved toward each other, causing the first and second fingers 440, 442 to grip the film cartridge 34.

As shown in FIG. 25, the flat surface 444 of the first finger 440 holds the straight edge 28c of the film cartridge 34 and the slanted surface 446 thereof holds the circumferential surface 28a of the film cartridge 34, whereas the flat surface 448 and the slanted surfaces 450a, 450b of the second finger 442 support the circumferential surface 28a of the film cartridge 34. Therefore, when the film cartridge 34 is gripped by the first and second fingers 440, 442, the port 28d of the film cartridge 34 can accurately be positioned, and the film cartridge 34 can accurately be supplied to the bucket 564 on the second straight feed path 48 (see FIG. 30).

The second straight feed path 48 extends from the dark chamber 44 to bright chamber 45. As shown in FIG. 29, the second straight feed path 48 feeds the film cartridge 34 to the bent portion thereof while shielding the film cartridge 34 against light with the light-shield cover 540, and then delivers the film cartridge 34 to the inspection table 542. On the inspection table 542, a vertical torque required to pull out the tongue 16c of the film 16 projecting from the film cartridge 34, the length of the tongue 16c, the height of the film cartridge 34, and the cap 26b are detected. Those film cartridges 34 that have been found defective based on the detected results is discharged from the defective film cartridge gate 544, and those film cartridges 34 that have been found acceptable are delivered to the encasing unit 42.

In the encasing unit 42, as shown in FIG. 30, after a case 38 is delivered to a bucket 566 on the index table 546 in the supply station ST1b, the index table 546 is intermittently rotated in the direction indicated by the arrow I to bring the bucket 566 into the inserting station ST2b. The rotatable shaft 550 of the cartridge loading unit 548 is rotated to place the swing arm 552 over the film cartridge 34 supported in a bucket 564 on the second straight feed path 48.

The suction cup 562 is lowered, and the non-illustrated vacuum source is actuated to cause the suction cup 562 to attract the film cartridge 34. When the suction cup 562 with the attracted film cartridge 34 is elevated, the film cartridge 34 is introduced into the tube 558, and the tongue 16c of the sized film 16 is extended out of the opening 560 in the tube 558.

Then, the swing arm 552 is displaced by the rotatable shaft 550 to a position over the tubular member 568. Since the gear 556 on the upper end of the tube 558 is held in mesh with the sector gear 554, when the swing arm 552 is angularly moved from the second straight feed path 48 to the index table 546, the tube 558 rotates about its own axis in unison with the gear 556. Therefore, the tongue 16c extending out of the opening 560 in the tube 558 is neatly coiled into the tube 558.

The case 38 in the bucket 566 on the index table 546 is positioned below the tube 558. The case 38 is lifted into the tube 558 by a cam or the like (not shown). The suction cup 562 is lowered, and ejects air, rather than draws air, for thereby inserting the film cartridge 34 attracted by the suction cup 562 into the case 38.

As shown in FIG. 29, the case 38 with the film cartridge 34 inserted therein is delivered to the cartridge detecting station ST3b upon intermittent rotation of the index table 546 in the direction indicated by the arrow. After the film cartridge 34 is detected in the cartridge detecting station ST3b, a case cap 40 is inserted into the open end of the case 38 in the case cap inserting station ST4b, thus producing a packaged product 12. If the packaged product 12 is found defective, then the package product 12 is discharged from the defective packaged product discharging station ST6b. If the packaged product 12 is found acceptable, then the packaged product 12 is delivered from the normal packaged product discharging station ST5b onto the conveyor 77, which delivers the packaged product 12 to the packaged product accumulating units 76a, 76b, 76c which are disposed near the parts supply apparatus 58.

The film cartridge 34 may not be inserted into the case 38 by the encasing unit 42, but may directly delivered by the conveyor 77 to a semifinished product accumulating units 79.

In the method of and the apparatus for manufacturing a film cartridge according to the present invention, a single-open-ended cartridge is inserted in its axial direction into the cartridge positioning and holding mechanism with a cap clinched on the open end of the single-open-ended cartridge being oriented ahead, then a film coil is inserted along the spool axis into the single-open-ended cartridge, and the movable chuck is closed to form and hold the single-open-ended cartridge. Since the single-open-ended cartridge and the film coil are inserted in their axial direction into the cartridge positioning and holding mechanism, the angular range in which the movable chuck of the cartridge positioning and holding mechanism is opened and closed can be set to as small a value as possible. Consequently, film cartridges can be manufactured accurately and efficiently with a simple arrangement.

Although a certain preferred embodiment of the present invention has been shown and described in detail, it should be understood that various changes and modifications may be made therein without departing from the scope of the appended claims.

What is claimed is:

1. A method of manufacturing a film cartridge, comprising the steps of:

inserting a single-open-ended cartridge, which is produced by rounding a cartridge blank sheet and clinching a cap thereon, into a cartridge positioning and holding mechanism with the cap positioned ahead, in an axial direction of the single-open-ended cartridge;

guiding a cap side of said single-open-ended cartridge with a fixed guide of said cartridge positioning and holding mechanism to position said single-open-ended cartridge;

inserting a film coil, which comprises a sized film wound on a spool, into said single-open-ended cartridge in an axial direction of the spool;

thereafter, closing a movable chuck of said cartridge positioning and holding mechanism to form and hold said single-open-ended cartridge; and clinching a cap on an opposite open end of said single-open-ended cartridge, thereby producing a film cartridge.

2. A method according to claim 1, wherein said step of closing a movable chuck comprises the step of opening and closing a folded-edge chuck and a straight-edge chuck of said movable chuck to grip a folded edge and a straight edge of said single-open-ended cartridge for thereby forming and holding said single-open-ended cartridge.

3. A method according to claim 1, further comprising the step of rotating said single-open-ended cartridge about an axis thereof for positioning the single-open-ended cartridge (28) in a circumferential direction thereof, before said single-open-ended cartridge is inserted into said cartridge positioning and holding mechanism.

4. A method according to claim 1, wherein said step of inserting the film coil into said single-open-ended cartridge comprises the steps of lifting said single-open-ended cartridge while being guided by an insertion guide, and inserting the film coil into said single-open-ended cartridge while being guided by said insertion guide.

5. A method according to claim 1, wherein said step of inserting the film coil into said single-open-ended cartridge comprises the steps of holding a boss of said spool with a spool chuck, and gripping a tongue on a distal end of said sized film with a tongue chuck.

6. A method according to claim 5, wherein said step of inserting the film coil into said single-open-ended cartridge comprises the steps of lifting said single-open-ended cartridge while being guided by an insertion guide, and inserting the film coil into said single-open-ended cartridge while being guided by said insertion guide.

7. A method according to claim 1, further comprising the step of removing said film cartridge from cartridge positioning and holding mechanism by gripping a straight edge of the film cartridge and a circumferential surface thereof opposite to said straight edge with a pair of fingers.

* * * * *